United States Patent
Manabe et al.

(10) Patent No.: US 11,817,934 B2
(45) Date of Patent: Nov. 14, 2023

(54) WIRELESS COMMUNICATION SYSTEM

(71) Applicant: NSK LTD., Tokyo (JP)

(72) Inventors: Keisuke Manabe, Kanagawa (JP); Toshihiko Okamura, Kanagawa (JP); Tomoyuki Yanagisawa, Kanagawa (JP)

(73) Assignee: NSK LTD., Tokyo (JP)

( * ) Notice: Subject to any disclaimer, the term of this patent is extended or adjusted under 35 U.S.C. 154(b) by 36 days.

(21) Appl. No.: 17/488,618

(22) Filed: Sep. 29, 2021

(65) Prior Publication Data
US 2022/0021438 A1 Jan. 20, 2022

Related U.S. Application Data

(63) Continuation of application No. PCT/JP2020/015394, filed on Apr. 3, 2020.

(30) Foreign Application Priority Data

Apr. 8, 2019 (JP) .................................. 2019-073259

(51) Int. Cl.
*H04B 7/145* (2006.01)
(52) U.S. Cl.
CPC .................... *H04B 7/145* (2013.01)
(58) Field of Classification Search
None
See application file for complete search history.

(56) References Cited

U.S. PATENT DOCUMENTS

| | | | |
|---|---|---|---|
| 3,657,652 A | 4/1972 | Smith | |
| 7,262,743 B2 | 8/2007 | Locatelli et al. | |
| 9,835,318 B2* | 12/2017 | Ando | H01Q 13/18 |
| 2002/0028655 A1* | 3/2002 | Rosener | H04W 16/26 |
| | | | 455/13.1 |
| 2017/0099094 A1* | 4/2017 | Gluck | H04B 7/145 |
| 2021/0091847 A1* | 3/2021 | Ho | H01Q 15/02 |

FOREIGN PATENT DOCUMENTS

| | | |
|---|---|---|
| JP | 51-024210 B1 | 7/1976 |
| JP | 5-097138 U | 12/1993 |
| JP | 11-163773 A | 6/1999 |
| JP | 2000-068912 A | 3/2000 |
| JP | 2003-022492 A | 1/2003 |

(Continued)

OTHER PUBLICATIONS

International Search Report for PCT/JP2020/015394 dated Jun. 23, 2020.

(Continued)

*Primary Examiner* — Shripal K Khajuria
(74) *Attorney, Agent, or Firm* — Sughrue Mion, PLLC

(57) ABSTRACT

A wireless communication system includes a wireless sensor provided inside a metal housing; a receiver provided outside the metal housing to receive radio waves from the wireless sensor; and a passive repeater provided between the inside and the outside of the metal housing. The passive repeater includes a receiving antenna provided inside the metal housing and a transmitting antenna provided outside the metal housing. The receiving antenna of the passive repeater and the transmitting antenna of the passive repeater are electrically connected through a hole formed in the metal housing.

10 Claims, 21 Drawing Sheets

(56) References Cited

FOREIGN PATENT DOCUMENTS

| | | |
|---|---|---|
| JP | 2003-139155 A | 5/2003 |
| JP | 2005-509356 A | 4/2005 |
| JP | 2009-147610 A | 7/2009 |
| JP | 2016-058167 A | 4/2016 |
| JP | 2018-066433 A | 4/2018 |
| JP | 2019-022177 A | 2/2019 |
| WO | 2016/199846 A1 | 12/2016 |

OTHER PUBLICATIONS

Written Opinion for PCT/JP2020/015394 dated Jun. 23, 2020.
Office Action dated Jan. 11, 2022 in Japanese Application No. 2021-513617.

* cited by examiner

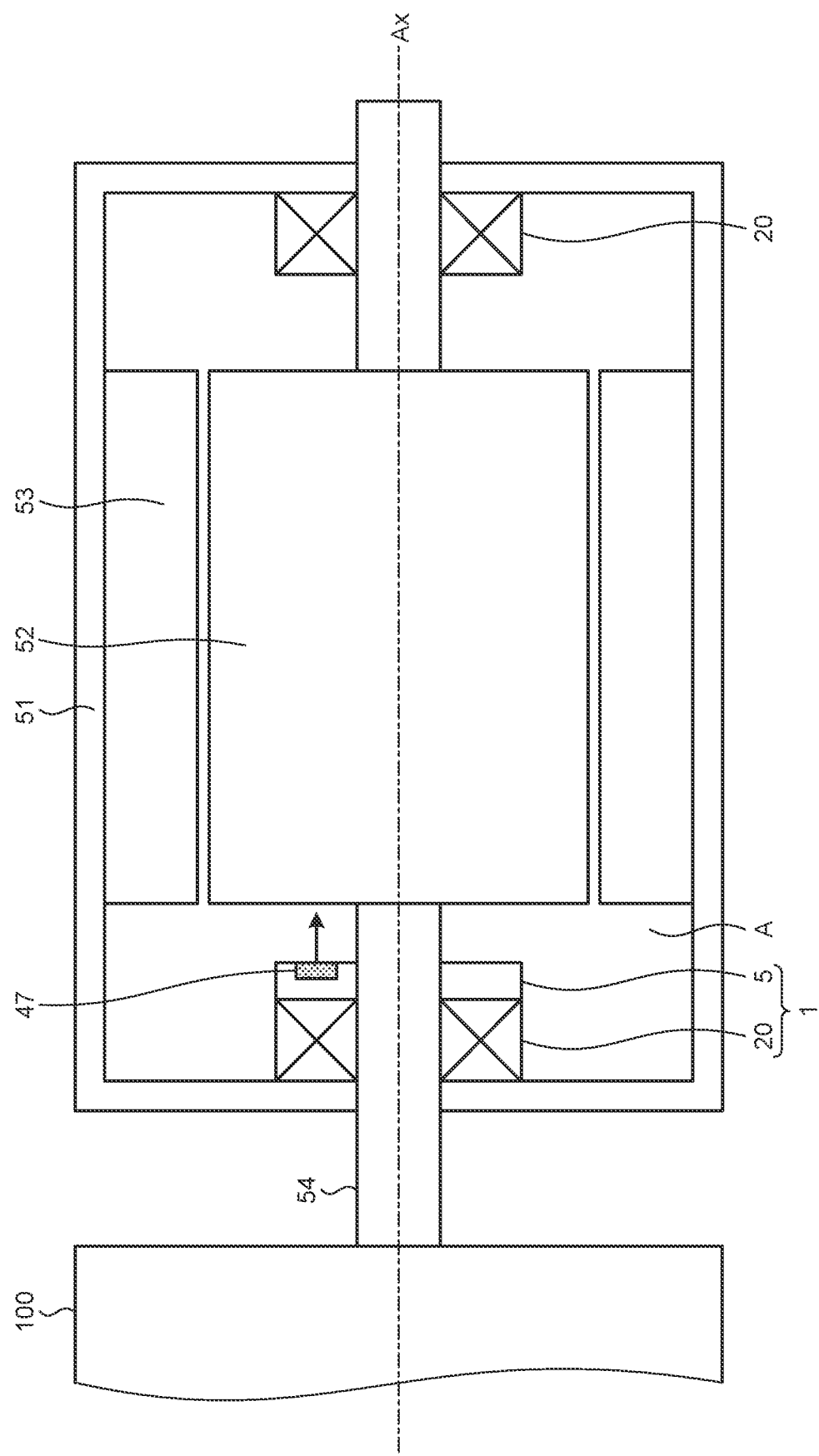

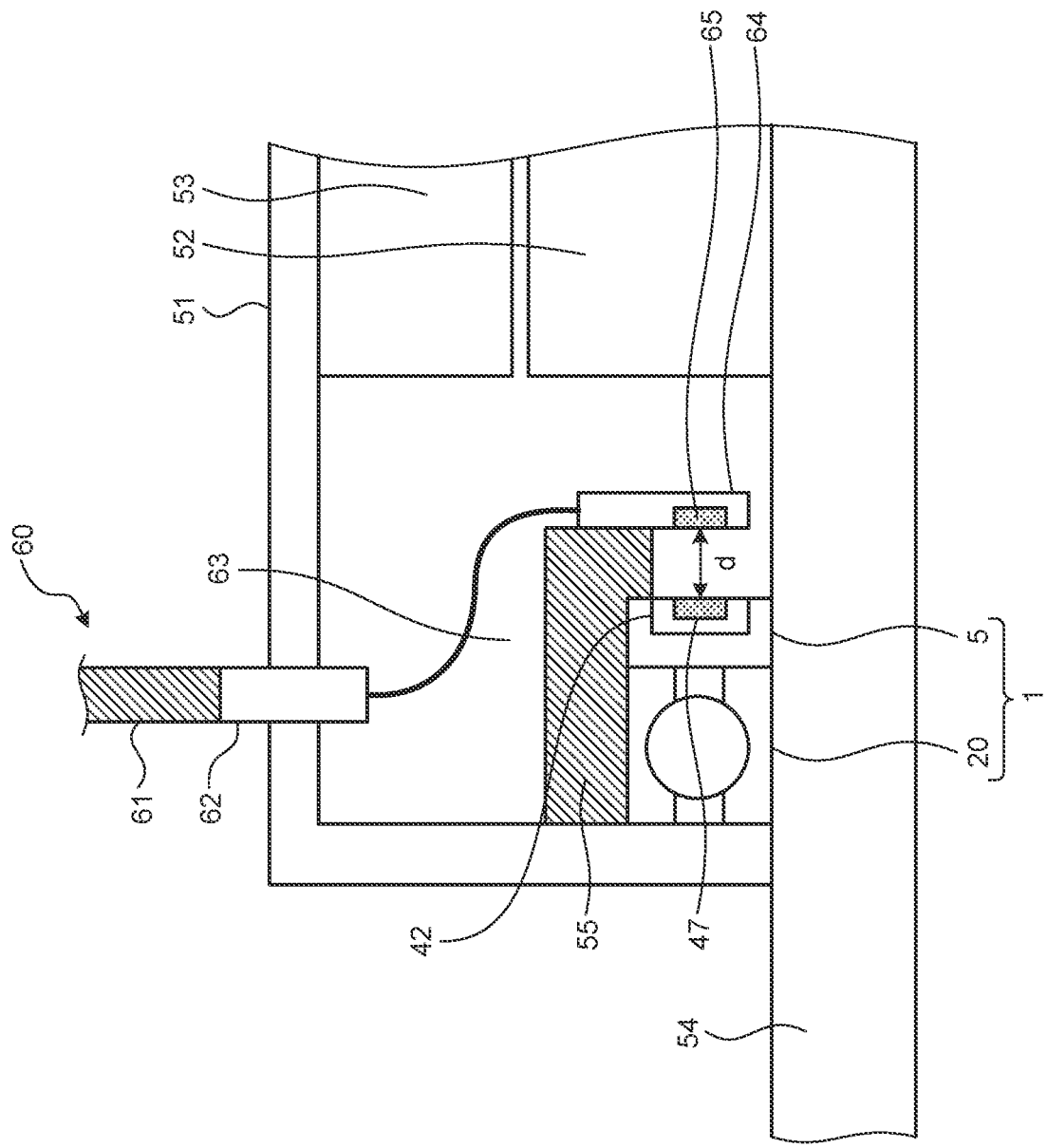

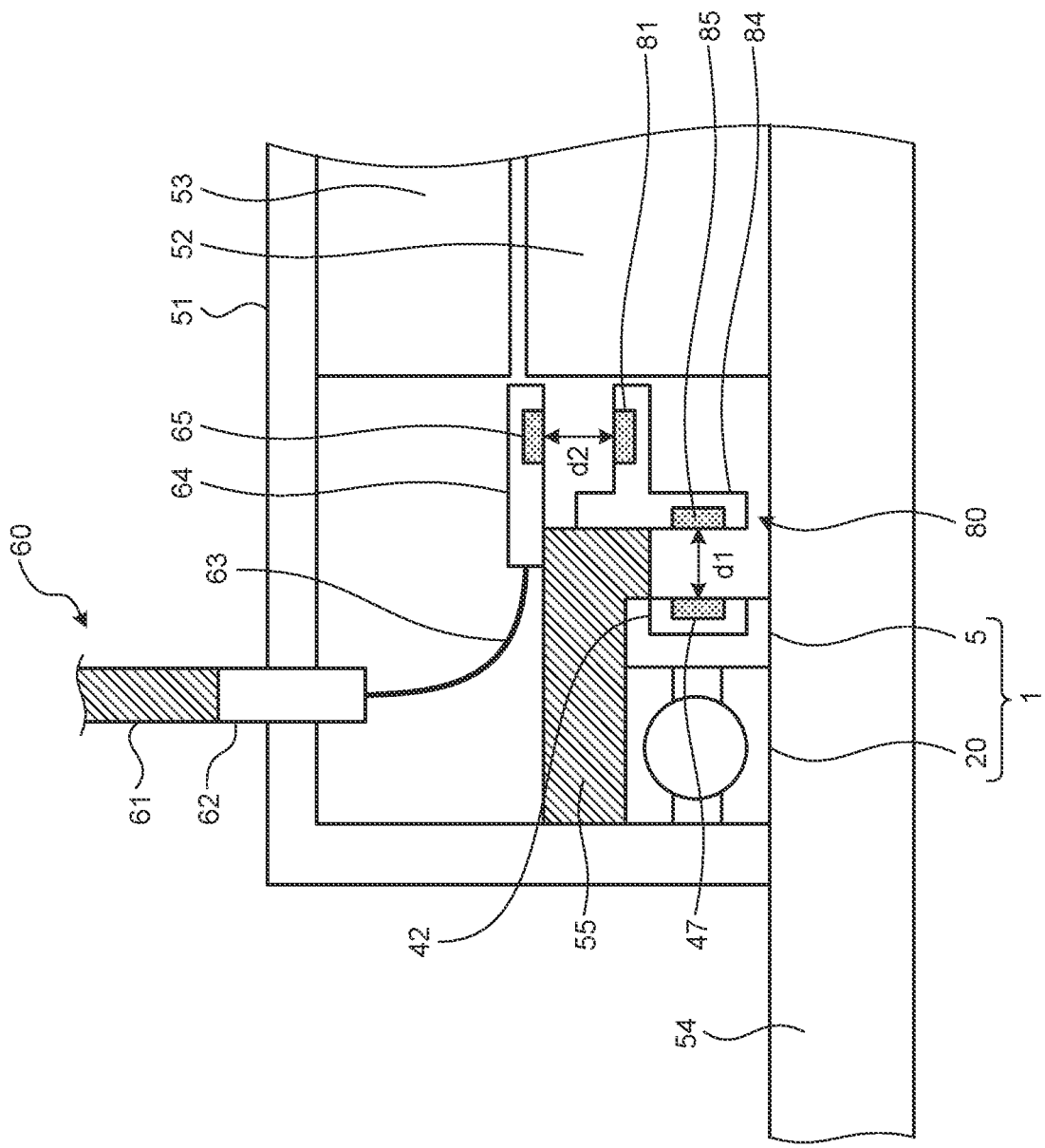

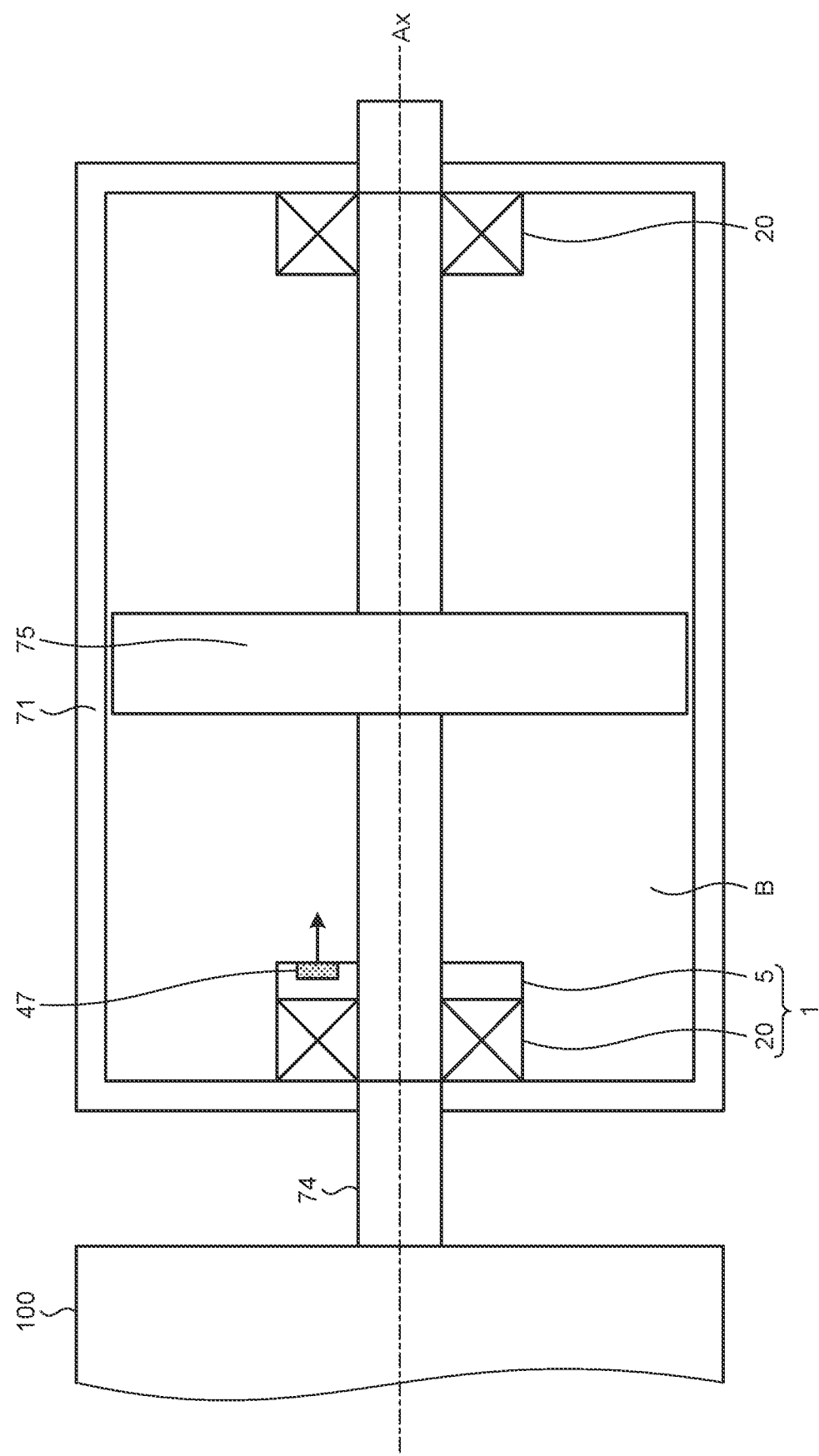

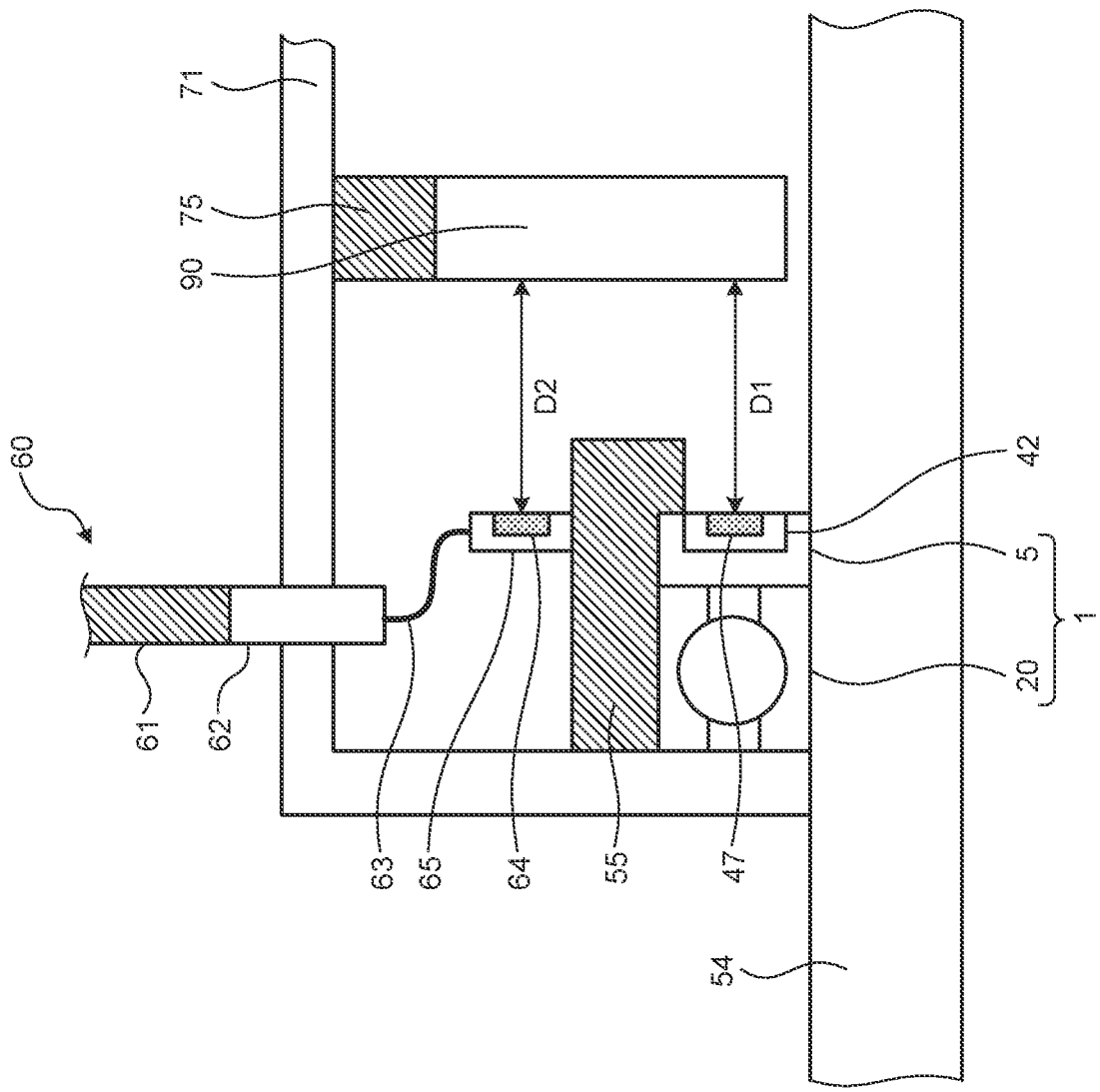

WIRELESS COMMUNICATION SYSTEM

CROSS-REFERENCE TO RELATED APPLICATION

This application is a continuation of PCT International Application No. PCT/JP2020/015394 filed on Apr. 3, 2020 which claims the benefit of priority from Japanese Patent Application No. 2019-073259 filed on Apr. 8, 2019, the entire contents of which are incorporated herein by reference.

BACKGROUND OF THE INVENTION

1. Field of the Invention

The present invention relates to a wireless communication system.

2. Description of the Related Art

Wireless sensor-equipped bearings have been proposed, which contain a variety of sensors such as a vibration sensor, an accelerometer, a rotation sensor, and a temperature sensor to output data acquired by the sensors through wireless communication (for example, Japanese Patent Application Laid-open No. 2018-66433). Typically, such a wireless sensor-equipped bearing has a configuration that does not require power supply from the outside by being supplied with electric power generated using rotation of a rotating machine.

When a wireless sensor is incorporated in a metal housing of the rotating machine, the metal housing may block radio waves and prevents wireless communication with the outside. The metal housing is usually provided with a hole to allow radio waves to pass through. It is, however, difficult to provide a large hole in terms of foreign substances entering into the housing, mechanical characteristics such as the strength of the housing, or electrical characteristics such as unnecessary radiation. On the other hand, if the hole to allow radio waves to pass through is small, radio waves necessary for wireless communication may not sufficiently pass through and wireless communication with the outside may be substantially failed. The "wireless sensor" referred to herein has neither data transmission line nor power supply line. Based on this, wireless communication is preferably performed with no power supply and with no wiring.

The present invention has been made in view of the foregoing problem, and an object of the present invention is to provide a wireless communication system that enables wireless communication between a wireless sensor provided inside a metal housing and the outside, with no power supply and with no wiring at least for the wireless sensor.

SUMMARY OF THE INVENTION

A wireless communication system according to an aspect of the present invention includes a wireless sensor provided inside a metal housing; a receiver provided outside the metal housing to receive radio waves from the wireless sensor; and a passive repeater provided between the inside and the outside of the metal housing. The passive repeater includes a receiving antenna provided inside the metal housing and a transmitting antenna provided outside the metal housing. The receiving antenna of the passive repeater and the transmitting antenna of the passive repeater are electrically connected through a hole formed in the metal housing.

The configuration above provides a wireless communication system that enables wireless communication between the wireless sensor provided inside the metal housing and the outside even when the hole to allow radio waves to pass through is small.

As a preferable embodiment of the wireless communication system; of the receiving antenna of the passive repeater and the transmitting antenna of the passive repeater, at least the receiving antenna of the passive repeater is a monopole antenna.

This configuration enables the antenna to be installed even in a narrow metal housing. In addition, the size increase of the housing due to installation of the antenna can be minimized.

As a preferred embodiment of the wireless communication system; of the receiving antenna of the passive repeater and the transmitting antenna of the passive repeater, at least the receiving antenna of the passive repeater is a non-radial antenna.

This configuration enables communication with stable performance independently of the grounding condition of the antenna.

As a preferred embodiment of the wireless communication system; of the receiving antenna of the passive repeater and the transmitting antenna of the passive repeater, at least the receiving antenna of the passive repeater is a microstrip patch antenna.

This configuration enables the antenna to be installed even in a narrow metal housing.

As a preferred embodiment of the wireless communication system; of the receiving antenna of the passive repeater and the transmitting antenna of the passive repeater, at least the transmitting antenna of the passive repeater is a dipole antenna.

This configuration can increase the antenna gain and improve the communication capacity.

As a preferred embodiment of the wireless communication system; of the receiving antenna of the passive repeater and the transmitting antenna of the passive repeater, at least the receiving antenna of the passive repeater is a pattern antenna.

This configuration enables the antenna to be installed even in a narrow metal housing.

As a preferred embodiment of the wireless communication system; of the receiving antenna of the passive repeater and the transmitting antenna of the passive repeater, at least the transmitting antenna of the passive repeater is a monopole antenna.

This configuration can provide an omnidirectional and nondirectional wireless communication system.

As a preferred embodiment of the wireless communication system; the receiving antenna of the passive repeater is disposed at a position where a distance d from a transmitting antenna of the wireless sensor is $\lambda/2\pi$ or less, where a wavelength of fundamentals of the radio waves is $\lambda$.

This configuration can utilize the electromagnetic coupling action in a near field produced between the receiving antenna of the passive repeater and the transmitting antenna of the wireless sensor.

As a preferred embodiment of the wireless communication system; the transmitting antenna of the wireless sensor is any one of a pattern antenna, a microstrip patch antenna, and a chip antenna, and the receiving antenna of the passive repeater is disposed to face the transmitting antenna of the wireless sensor.

This configuration can suppress power loss (path loss) between the transmitting antenna of the wireless sensor and the receiving antenna of the passive repeater.

As a preferred embodiment of the wireless communication system; the wireless communication system includes a radio wave reflector provided inside the metal housing to reflect the radio waves.

This configuration can suppress power loss (path loss) between the transmitting antenna of the wireless sensor and the receiving antenna of the passive repeater.

As a preferred embodiment of the wireless communication system; the radio wave reflector is disposed at a position where a distance D from a transmitting antenna of the wireless sensor is 2λ or less, where a wavelength of fundamentals of the radio waves is λ.

This configuration can suppress power loss (path loss) between the transmitting antenna of the wireless sensor and the receiving antenna of the passive repeater.

As a preferred embodiment of the wireless communication system; the transmitting antenna of the wireless sensor is any one of a pattern antenna, a microstrip patch antenna, and a chip antenna, and the radio wave reflector is disposed to face the transmitting antenna of the wireless sensor.

This configuration can suppress power loss (path loss) between the transmitting antenna of the wireless sensor and the receiving antenna of the passive repeater.

As a preferred embodiment of the wireless communication system; the radio wave reflector is made of any one of copper, nickel, and aluminum, or an alloy containing 50% or more of one of copper, nickel, and aluminum.

A wireless communication system according to another aspect of the present invention includes a wireless sensor provided inside a metal housing; a receiver provided outside the metal housing to receive radio waves from the wireless sensor; a first passive repeater provided between the inside and the outside of the metal housing; and a second passive repeater provided inside the metal housing. The first passive repeater includes a receiving antenna provided inside the metal housing and a transmitting antenna provided outside the metal housing. The receiving antenna of the first passive repeater and the transmitting antenna of the first passive repeater are electrically connected through a hole formed in the metal housing. The second passive repeater includes a receiving antenna configured to receive radio waves from a transmitting antenna of the wireless sensor and a transmitting antenna configured to transmit the radio waves received by the receiving antenna to the receiving antenna of the first passive repeater.

The configuration above provides a wireless communication system that enables wireless communication between the wireless sensor provided inside the metal housing and the outside even when the hole to allow radio waves to pass through is small.

As a preferred embodiment of the wireless communication system; the receiving antenna of the second passive repeater is disposed at a position where a distance d from the transmitting antenna of the wireless sensor is λ/2π or less, where a wavelength of fundamentals of the radio waves is λ.

This configuration can utilize the electromagnetic coupling action in a near field produced between the receiving antenna of the second passive repeater and the transmitting antenna of the wireless sensor.

As a preferred embodiment of the wireless communication system; the transmitting antenna of the wireless sensor is any one of a pattern antenna, a microstrip patch antenna, and a chip antenna, and the receiving antenna of the second passive repeater is disposed to face the transmitting antenna of the wireless sensor.

This configuration can suppress power loss (path loss) between the receiving antenna of the second passive repeater and the transmitting antenna of the wireless sensor.

As a preferred embodiment of the wireless communication system; the receiving antenna of the first passive repeater is disposed to face the transmitting antenna of the second passive repeater.

This configuration can suppress power loss (path loss) between the receiving antenna of the first passive repeater and the transmitting antenna of the second passive repeater.

BRIEF DESCRIPTION OF THE DRAWINGS

FIG. 16 is a diagram illustrating an example of the internal configuration of a motor including the wireless sensor-equipped bearing;

FIG. 17B is a diagram illustrating an application example of the wireless communication system according to the third embodiment;

FIG. 18B is a diagram illustrating an application example of the wireless communication system according to the fourth embodiment;

FIG. 19 is a diagram illustrating an example of the internal configuration of a speed reducer including the wireless sensor-equipped bearing;

FIG. 20B is a diagram illustrating an application example of the wireless communication system according to the fifth embodiment.

DETAILED DESCRIPTION OF THE PREFERRED EMBODIMENTS

Embodiments for Carrying Out the Invention (hereinafter referred to as embodiments) will be described in detail below with reference to the drawings. It should be noted that the present invention is not limited by the following embodiments. The constituent elements in the following embodiments include those easily conceived by those skilled in the art, those substantially identical, and equivalents. The constituent elements disclosed in the following embodiments can be combined as appropriate.

Wireless Sensor-Equipped Bearing

First, a wireless sensor-equipped bearing will be described as an example to which a wireless sensor according to the present embodiment is applied.

Figure 1:
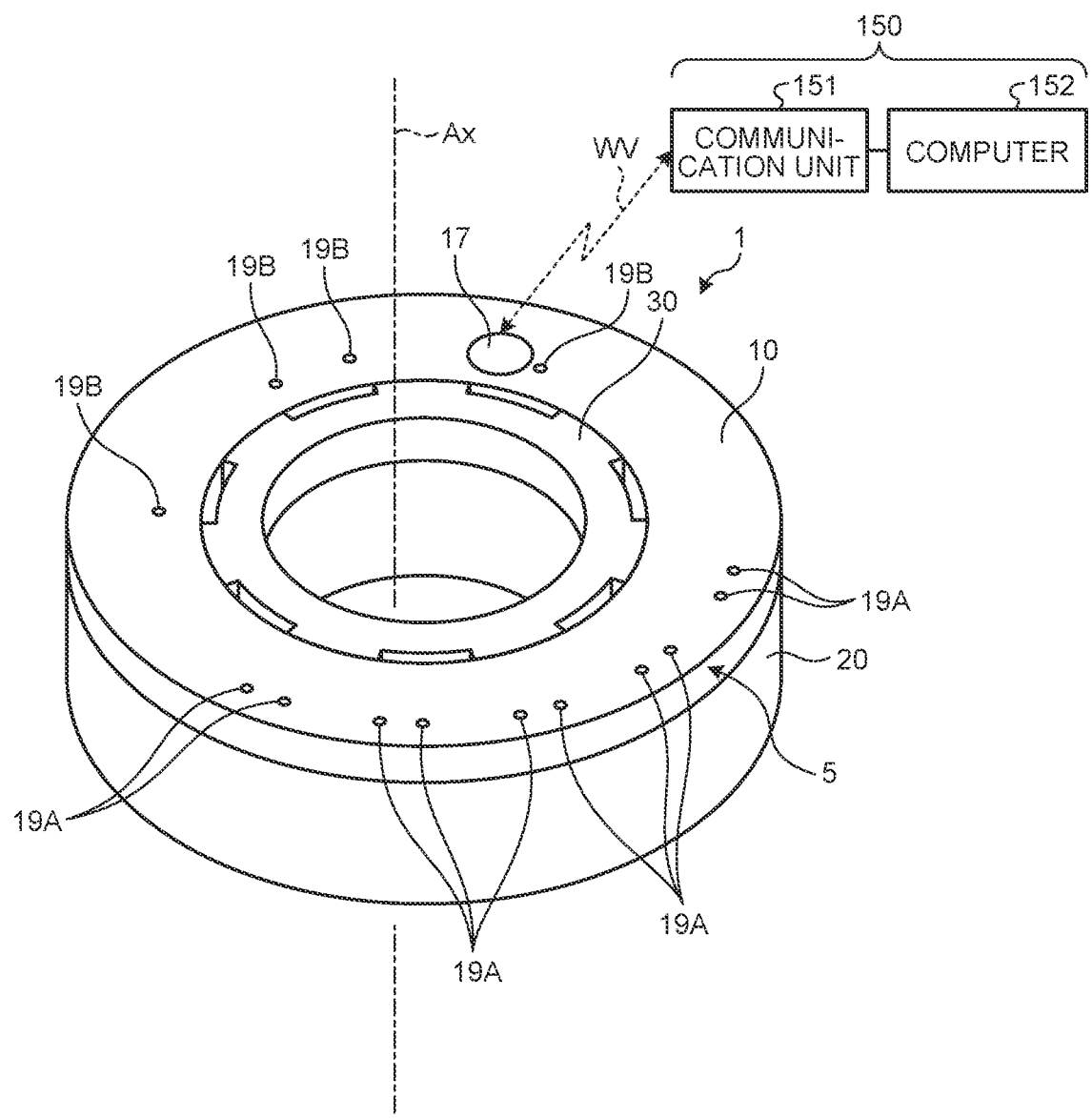
FIG. 1 is a perspective view of a wireless sensor-equipped bearing.
Figure 2:
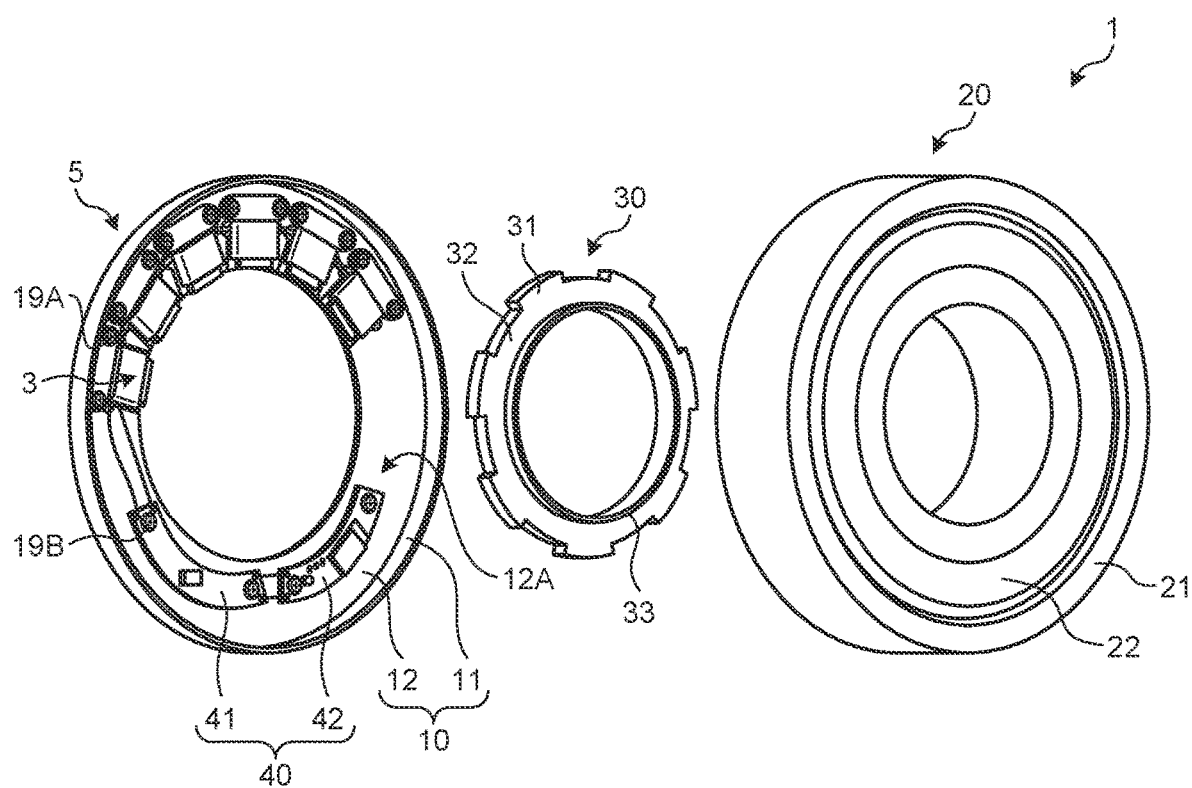
FIG. 2 is an exploded perspective view of the wireless sensor-equipped bearing.
Figure 3:
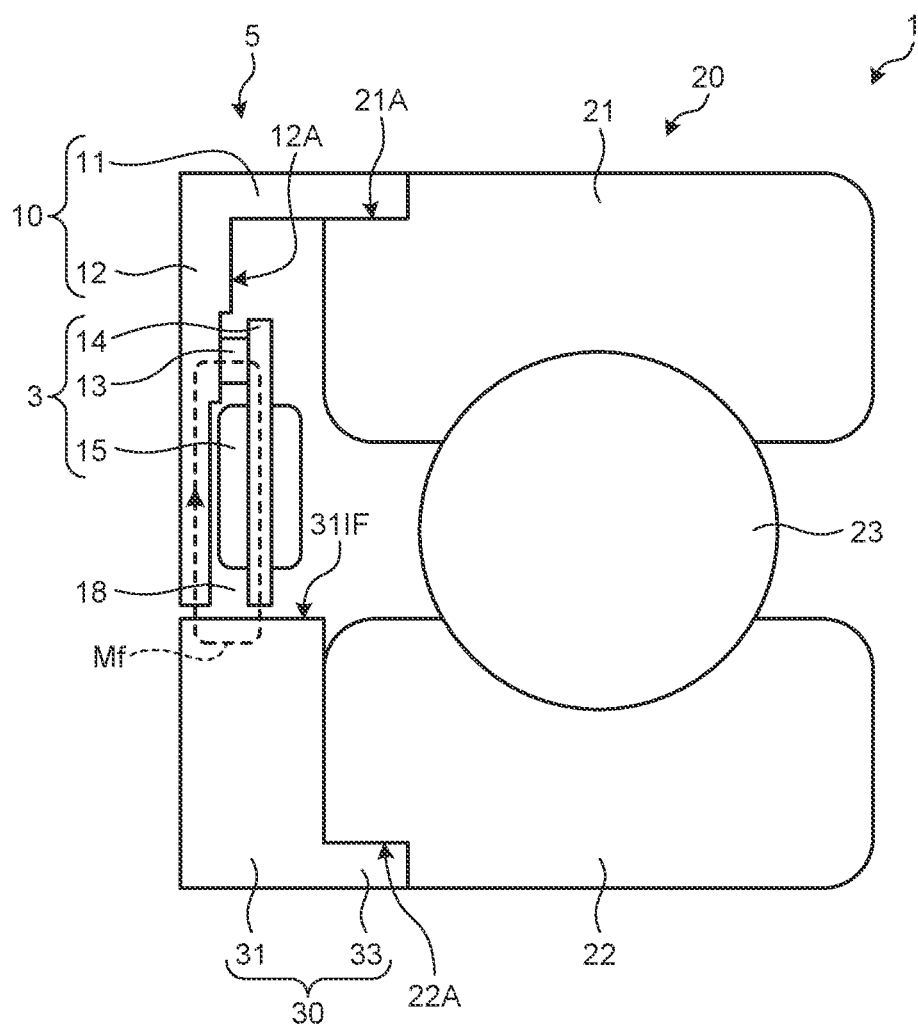
FIG. 3 is a sectional view of a portion including a power generator and a projection in the wireless sensor-equipped bearing.
Figure 4:
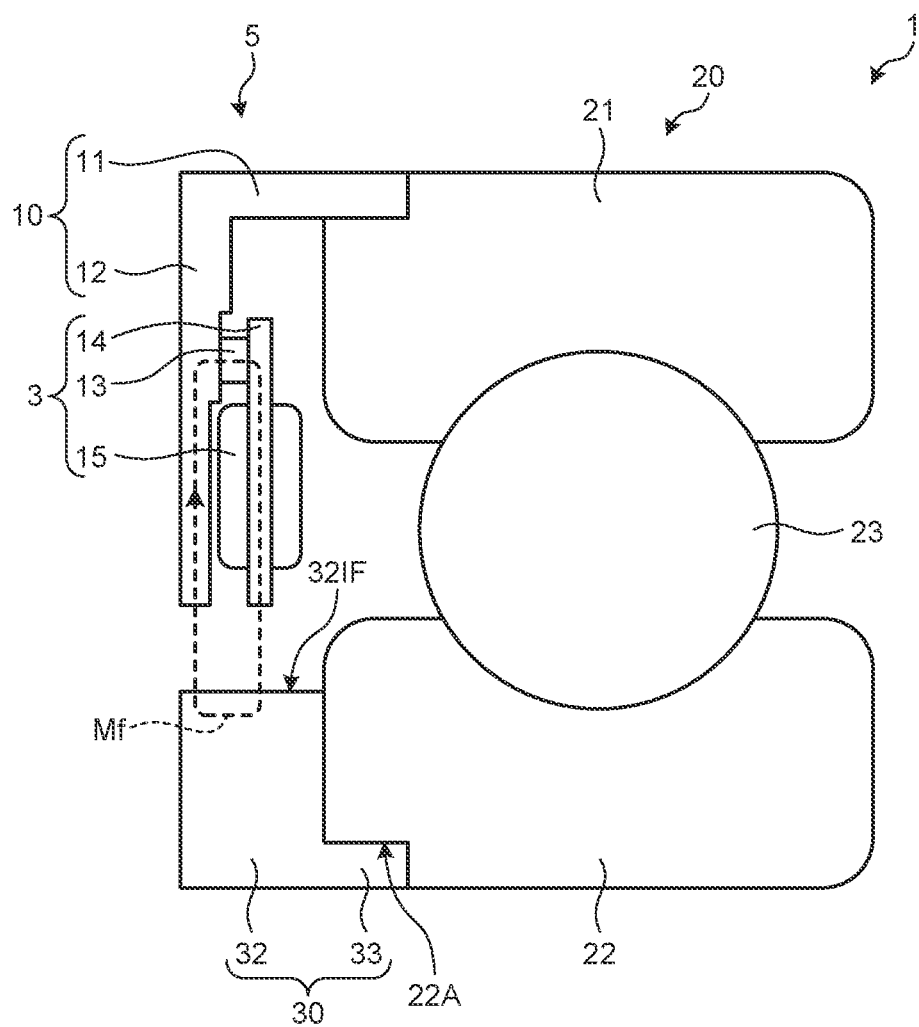
FIG. 4 is a sectional view of a portion including the power generator and a recess in the wireless sensor-equipped bearing.
Figure 5:
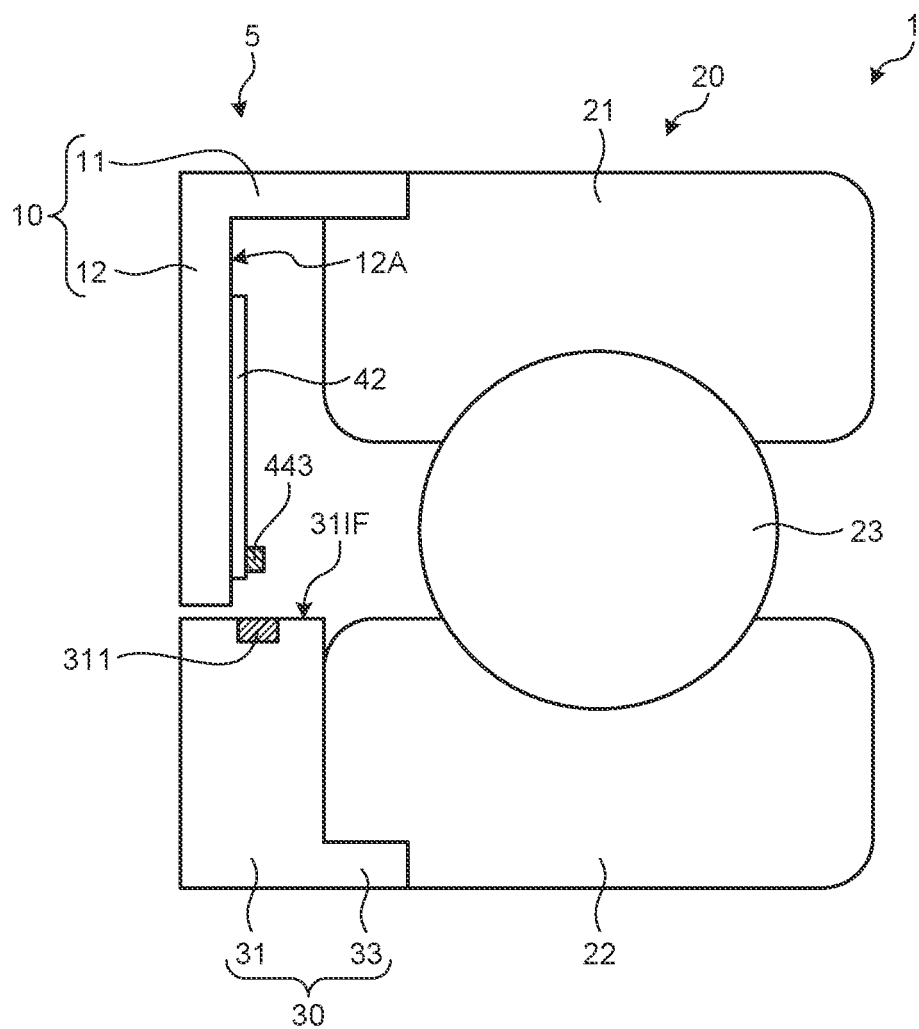
FIG. 5 is a sectional view of a portion including a sensor substrate in the wireless sensor-equipped bearing.

FIG. 1 is a perspective view of a wireless sensor-equipped bearing. FIG. 2 is an exploded perspective view of the wireless sensor-equipped bearing. FIG. 3 is a sectional view of a portion including a power generator and a projection in the wireless sensor-equipped bearing. FIG. 4 is a sectional view of a portion including the power generator and a recess in the wireless sensor-equipped bearing. FIG. 5 is a sectional view of a portion including a sensor substrate in the wireless sensor-equipped bearing. As illustrated in FIG. 2, a wireless sensor-equipped bearing 1 illustrated in FIG. 1 includes a wireless sensor unit 5, a tone ring 30, and a bearing body 20.

As illustrated in FIG. 3 to FIG. 5, the bearing body 20 is a rolling bearing including an outer ring 21, an inner ring 22, and a rolling element 23. The outer ring 21 and the inner ring 22 rotate relative to each other about a rotational axis Ax (refer to FIG. 1). Although the inner ring 22 is hereinafter described as a rotating ring, either the inner ring 22 or the outer ring 21 may rotate as long as they rotate relative to each other.

A cover 10 has an annular top plate 12 and a tubular side plate 11 connected to the periphery of the top plate 12. The cover 10 is formed of a material having magnetism, such as any of silicon steel sheet, carbon steel (JIS standards SS400 or S45C), martensitic stainless steel (JIS standards SUS420), or ferritic stainless steel (JIS standards SUS430).

As illustrated in FIG. 2, in the wireless sensor unit 5, a plurality of power generators 3 and a substrate 40 are attached to one surface 12A of the top plate 12. The one surface 12A is a surface on the side facing the bearing body 20. The substrate 40 includes a power supply substrate 41 and a sensor substrate 42.

For example, as illustrated in FIG. 1 and FIG. 2, bolts 19A made of a nonmagnetic material such as brass are fastened to female screw holes formed in the top plate 12, whereby the power generators 3 are fixed to the top plate 12. Similarly, bolts 19B made of a nonmagnetic material such as brass are fastened to female screw holes formed in the top plate 12, whereby the power supply substrate 41 and the sensor substrate 42 are fixed to the top plate 12. As illustrated in FIG. 1, the bolts 19A and the bolts 19B each have a length that does not protrude from the cover 10 when attached to the cover 10.

The tone ring 30 has projections 31 protruding to the outer diameter side and recesses 32 recessed to the inner diameter side with respect to the projections 31. The projections 31 and the recesses 32 are provided alternately in a circumferential direction. The tone ring 30 has a tubular protrusion 33 protruding toward the bearing body 20 on the inner peripheral side. The tone ring 30 is formed of a material having magnetism, such as any of silicon steel sheet, carbon steel (JIS standards SS400 or S45C), martensitic stainless steel (JIS standards SUS420), or ferritic stainless steel (JIS standards SUS430).

The power generators 3 each include a permanent magnet 13, a yoke 14, and a coil 15. The permanent magnet 13 is fixed in contact with the top plate 12. The yoke 14 is fixed in contact with the permanent magnet 13. The yoke 14 is magnetically connected to the permanent magnet 13 and is not necessarily directly connected thereto. The yoke 14 is formed of a material having magnetism, such as silicon steel sheet or NiFe alloy. It is preferable that a material having a magnetic permeability equal to or higher than that of the material of the cover 10 be used for the yoke 14 so that the amount of magnetic flux inside the yoke 14 is increased. When the yoke 14 is a silicon steel sheet, the magnetic permeability is high and magnetic flux easily passes in the yoke 14.

The coil 15 is what is called a magnetic wire that is a conductor wound around the yoke 14. The coils 15 of the adjacent power generators 3 are connected in series, and a wire drawn from the coils 15 of a plurality of power generators 3 connected in series is connected to the power supply substrate 41.

As illustrated in FIG. 3, one end of the side plate 11 is fitted and fixed in a groove 21A provided on the outer periphery of the outer ring 21. The tubular protrusion 33 is fitted and fixed in a groove 22A provided on the inner periphery of the inner ring 22. Thus, as illustrated in FIG. 3 and FIG. 4, the inner peripheral end surface of the yoke 14 and the inner peripheral end surface of the top plate 12 are arranged at a position facing the projection 31 or the recess 32 of the tone ring 30. The cover 10 and the tone ring 30 are thus easily attached to the bearing body 20.

Under a magnetic field of the permanent magnet 13, magnetic flux Mf passes through the yoke 14, the projection 31 or the recess 32 of the tone ring 30, and the top plate 12 of the cover 10. The permanent magnet 13, the yoke 14, the projection 31 or the recess 32 of the tone ring 30, and the top plate 12 of the cover 10 therefore form a magnetic circuit.

As illustrated in FIG. 5, a magnetic body 311 exhibiting magnetism stronger than the tone ring 30 is attached to a part of an outer peripheral end surface 31IF of the projection 31. For example, a recess corresponding to the shape and the size of the magnetic body is provided in the outer peripheral end surface 31IF of the projection 31. The magnetic body 311 is fitted in this recess. The magnetic body 311 is flush with or substantially flush with the outer peripheral end surface 31IF surrounding the magnetic body 311. The magnetic body 311 is, for example, a permanent magnet of a hard magnetic material. In the tone ring 30, the magnetic body 311 is attached at only one place. The magnetic body 311 comes closest to an angular sensor 443 every time the inner ring 22 rotates once (rotates 360°) relative to the outer ring 21. The angular sensor 443 includes, for example, a Hall element.

Figure 6:
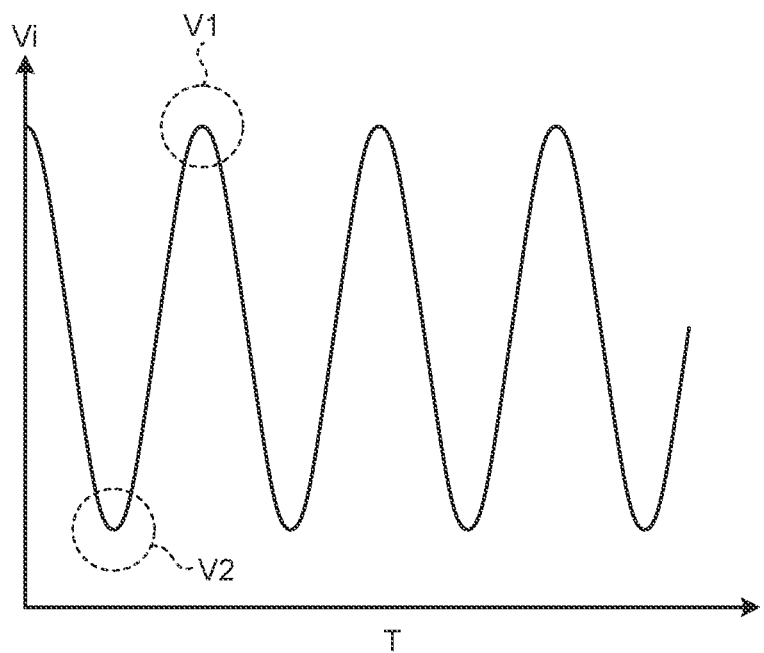
FIG. 6 is an explanatory diagram explaining the relation between voltage of electromotive force and time in the wireless sensor-equipped bearing.

FIG. 6 is an explanatory diagram explaining the relation between voltage of electromotive force and time in the wireless sensor-equipped bearing. Here, the horizontal axis in FIG. 6 is time T, and the vertical axis is voltage Vi of electromotive force. With the outer ring 21 fixed, the inner ring 22 rotates to allow the tone ring 30 to rotate together with the inner ring 22, and the tone ring 30 and the power generators 3 rotate relative to each other. For each yoke 14, an air gap from the inner peripheral end surface to the outer peripheral end surface 31IF of the projection 31 illustrated in FIG. 3 and an air gap from the inner peripheral end surface to an outer peripheral end surface 32IF of the recess 32 illustrated in FIG. 4 alternate each other.

In this way, the projections 31 and the recesses 32 on the outer periphery of the tone ring 30 allow the distance between the yoke 14 of the power generator 3 and the outer periphery of the tone ring 30 to periodically change. Thus, the density of magnetic flux Mf produced in the power generator 3 changes. When the yoke 14 with the permanent magnet 13 is proximate to the tone ring 30, the magnetic flux Mf passing through the permanent magnet 13, the yoke 14, and the tone ring 30 is large. When the yoke 14 is away from the tone ring 30, the magnetic flux Mf passing through the permanent magnet 13, the yoke 14, and the tone ring 30 is small. In response to the change in the density of the magnetic flux Mf, a voltage change occurs in the coil 15 having a magnet wire wound around the yoke 14.

More specifically, when the yoke 14 and the outer peripheral end surface 31IF of the projection 31 are closest to each other, the magnetic flux Mf illustrated in FIG. 3 is large, and voltage V1 of the electromotive force illustrated in FIG. 6 is supplied to the power supply substrate 41. When the yoke 14 and the outer peripheral end surface 32IF of the recess 32 are farthest from each other, the magnetic flux Mf illustrated in FIG. 4 is small, and voltage V2 of the electromotive force illustrated in FIG. 6 is supplied to the power supply substrate 41.

Figure 7:
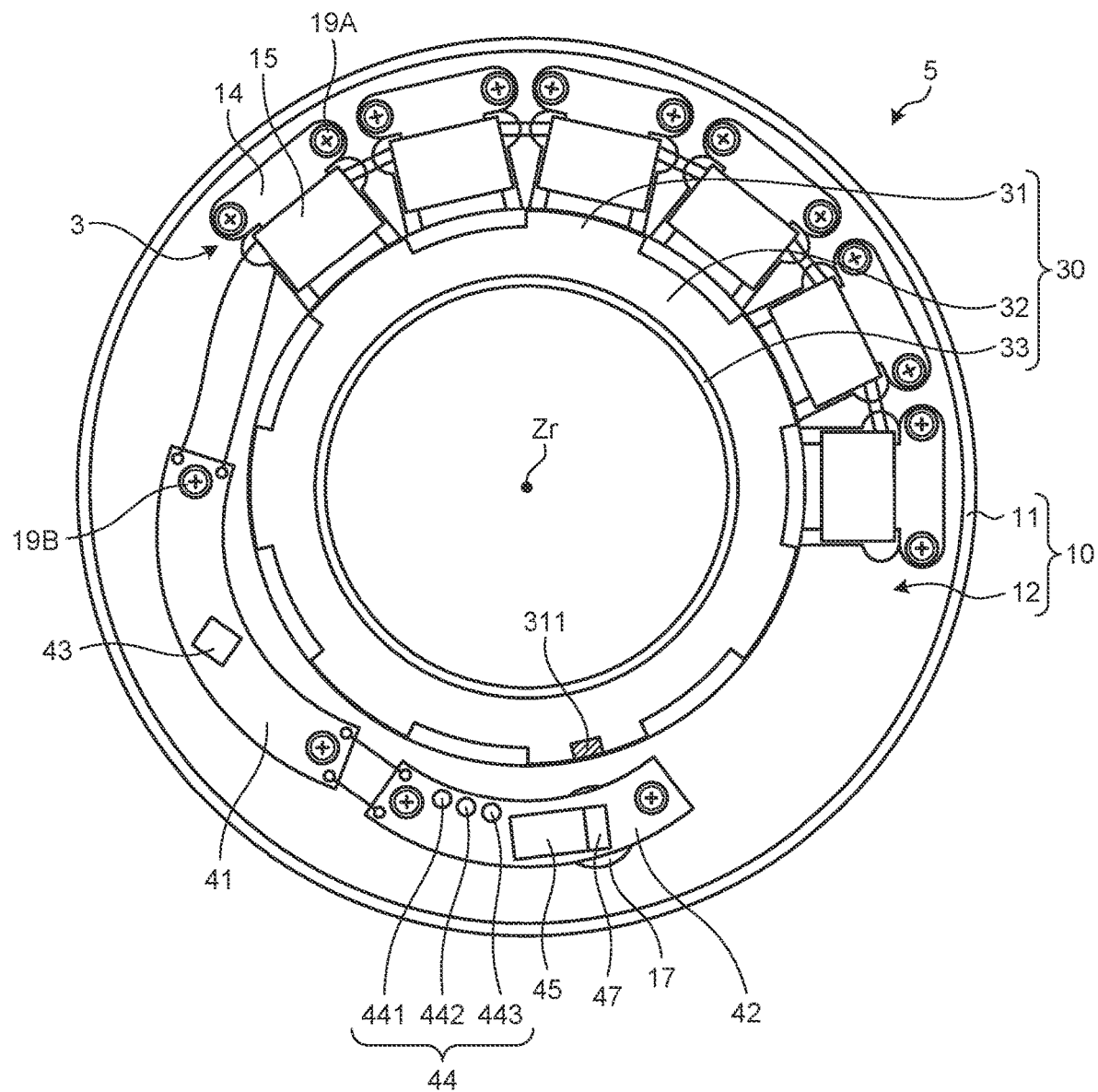
FIG. 7 is a plan view of a wireless sensor unit.

FIG. 7 is a plan view of the wireless sensor unit. As illustrated in FIG. 7, a power supply 43 is mounted on the power supply substrate 41. The power supply 43 converts a single-phase AC power supplied from the power generators 3 into a DC voltage and supplies the DC voltage to the sensor substrate 42. A sensor 44, a control unit 45 having a communication circuit, and an antenna 47 are mounted on the sensor substrate 42. DC power from the power supply 43 is supplied to the sensor 44 and the control unit 45. The sensor 44, the control unit 45, and the antenna 47 may be configured in separate integrated circuit (IC) chips, or some or all of them may be configured in a single IC chip. The sensor 44 includes, for example, an accelerometer 441, a temperature sensor 442, and the angular sensor 443. The sensor 44 may be one or two of the accelerometer 441, the temperature sensor 442, and the angular sensor 443 or may be a sensor that measures other physical quantities.

Figure 8:
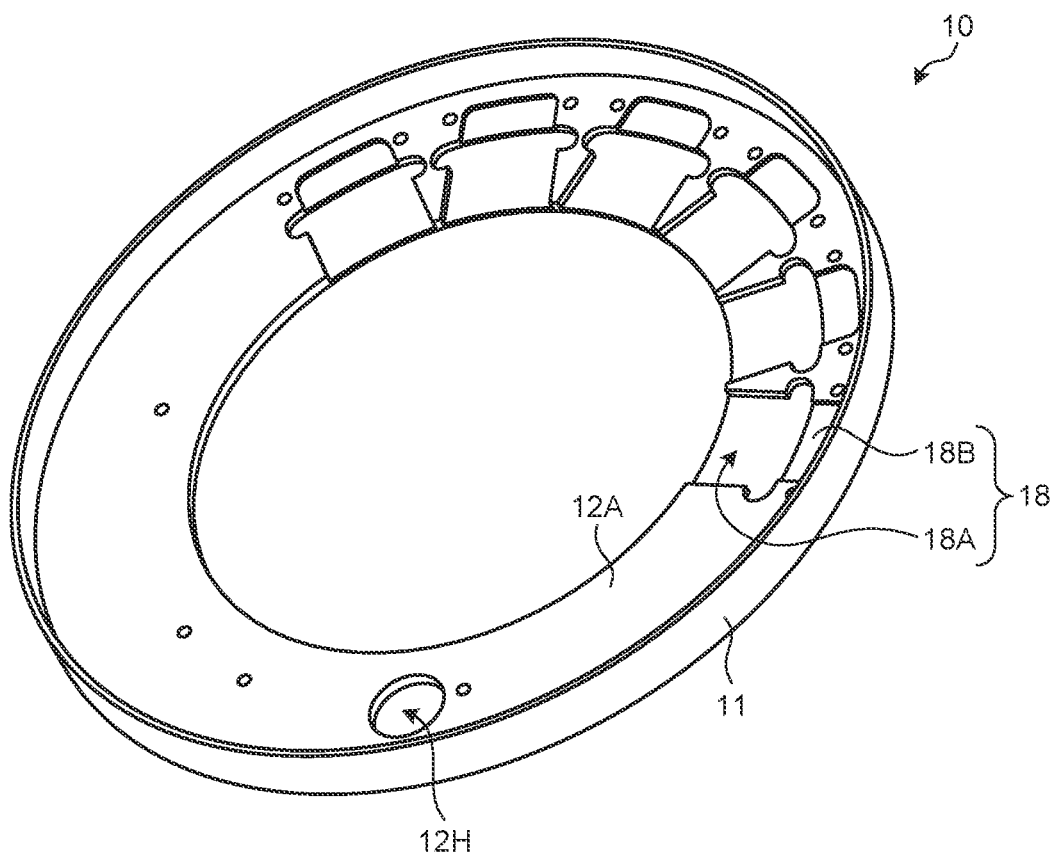
FIG. 8 is a perspective view of a cover.

FIG. 8 is a perspective view of the cover. As illustrated in FIG. 8, a through hole 12H is formed in the cover 10. As illustrated in FIG. 1, the through hole 12H is sealed by a nonmagnetic cap 17 formed of a nonmagnetic material such as resin. As described above, the cover 10 has the antenna 47 on the side facing the bearing body 20. Here, the cover 10 having magnetism has an action of shielding electromagnetic waves from the antenna 47. As illustrated in FIG. 7, therefore, in a planar view as viewed from the rotational axis Zr direction of the bearing body 20, the antenna 47 is disposed to overlap with the nonmagnetic cap 17. In other words, the nonmagnetic cap 17 is provided at a portion of the cover 10 facing the antenna 47. Electromagnetic waves WV from the antenna 47 therefore can reach a communication unit 151 through the nonmagnetic cap 17.

As illustrated in FIG. 8, a plurality of recesses 18 for disposing the power generators 3 are provided on one surface 12A of the top plate 12. For example, each of the plurality of recesses 18 has a first recess 18A for disposing the coil 15 and a second recess 18B for disposing the permanent magnet 13. When one surface 12A is a reference plane, the first recess 18A is deeper than the second recess 18B.

The control unit 45 has a function of converting various kinds of data detected by the sensor 44 from analog data to digital data (for example, A/D conversion) and storing the converted data. The control unit 45 also has a function of transmitting the stored digital data to the outside through the antenna 47. The control unit 45 operates using DC power supplied from the power supply 43.

Digital data transmitted from the wireless sensor unit 5 is received by the communication unit 151 of a high-level device 150 illustrated in FIG. 1. The digital data received by the communication unit 151 is processed by a computer 152. In this way, the wireless sensor-equipped bearing 1 can transmit digital data wirelessly and therefore can be downsized.

As the wireless sensor according to the present embodiment, there is a spacer-type wireless sensor module provided in the vicinity of a bearing, besides the wireless sensor-equipped bearing 1 described above. Hereinafter, a wireless communication system using a wireless sensor, such as the wireless sensor-equipped bearing 1 described above or a wireless sensor module, will be described with reference to FIG. 9 to FIG. 13. In the following description, the components substantially the same as in the configuration of the wireless sensor-equipped bearing 1 and the high-level device 150 illustrated in FIG. 1 to FIG. 8 are included.

First Embodiment

Figure 9:
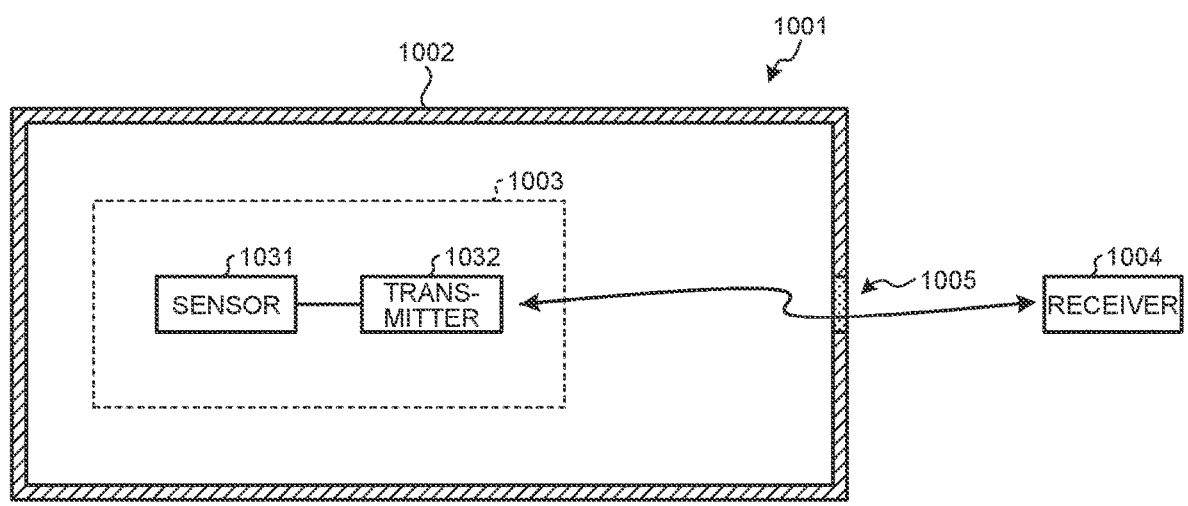
FIG. 9 is a schematic longitudinal sectional view of a wireless communication system according to a first embodiment.

FIG. 9 is a schematic longitudinal sectional view of a wireless communication system according to a first embodiment. As illustrated in FIG. 9, a wireless communication system 1001 according to the first embodiment includes a metal housing 1002 of a rotating machine, a wireless sensor 1003 provided inside the metal housing 1002, and a receiver 1004 provided outside the metal housing 1002.

The wireless sensor 1003 at least includes a sensor 1031 and a transmitter 1032 as elements that constitute the wireless communication system 1001 according to the present embodiment.

The sensor 1031 is, for example, at least one of the accelerometer 441, the temperature sensor 442, the angular sensor 443, and the sensor that measures other physical properties described above. The present disclosure is not limited by the configuration of the sensor 1031.

The transmitter 1032 includes a control circuit (not illustrated) for digitizing information detected by the sensor 1031 and a radio circuit (not illustrated) for converting the information digitized by the control circuit into a wireless signal and transmitting the wireless signal. The transmitter 1032 has any configuration as long as it does not require external power supply. For example, the transmitter 1032 may have a configuration in which the transmitter 1032 operates with electricity generated using rotation of the rotating machine.

Examples of the communication standards between the transmitter 1032 and the receiver 1004 include Bluetooth (registered trademark) or Wi-Fi (registered trademark).

Figure 10:
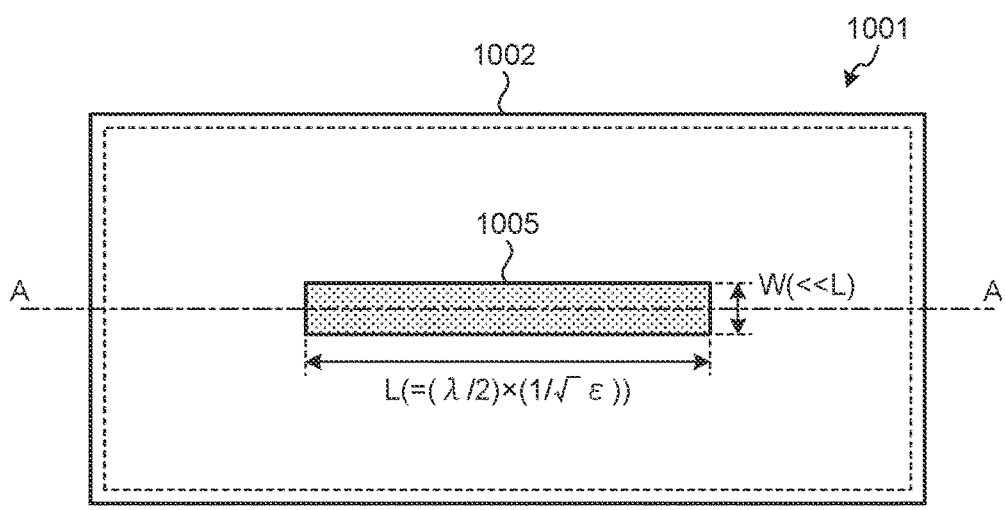
FIG. 10 is a diagram of a slit of the wireless communication system according to the first embodiment as viewed from the front.

In the present embodiment, the metal housing 1002 is provided with a slit 1005 (slot) surrounded by the metal housing 1002. An opening of the slit 1005 is preferably filled with, for example, resin such as engineering plastic in order to prevent foreign substances from entering the inside of the metal housing 1002. FIG. 10 is a diagram of the slit of the wireless communication system according to the first embodiment as viewed from the front.

It is preferable that a length L of the slit 1005 satisfy Equation (1) below, where the wavelength of fundamentals of radio waves used in communication between the transmitter 1032 and the receiver 1004 is $\lambda$, and the relative permittivity of the opening of the slit 1005 is $\varepsilon$.

$$L = (\lambda/2) \times (1/\sqrt{\varepsilon}) \quad (1)$$

In a case in which the opening of the slit 1005 is not filled with resin, the relative permittivity e of the opening of the slit 1005 is considered to be substantially 1 ($\varepsilon \approx 1$). In this case, the length L of the slit 1005 is denoted by Equation (2) below.

$$L \approx \lambda/2 \quad (2)$$

Alternatively, the wavelength $\lambda'$ of fundamentals of radio waves in metal is denoted by Equation (3) below. In Equation (3) below, K is a predetermined coefficient (for example, a predetermined value from 0.5 to 1.0) indicating the wavelength compaction ratio determined by resin or metal around the slit 1005, c is the speed of electromagnetic waves in a vacuum, and f is the frequency of radio waves emitted by the wireless sensor 1003. At this time, preferably, the length L of the slit 1005 satisfies Equation (4) below.

$$\lambda' = K \times (c/f) \quad (3)$$

$$L = \lambda'/2 = \{K \times (c/f)\}/2 \quad (4)$$

A width W ($\ll$L) of the slit 1005 is determined according to the communication standard between the transmitter 1032 and the receiver 1004. For example, when Bluetooth is used as the communication standard between the transmitter 1032 and the receiver 1004, it is preferable that the width of the slit 1005 be set to a width corresponding to frequency hopping spread spectrum (FHSS). In this case, the width is set such that a bandwidth from 2402 (MHz) to 2480 (MHz) is covered. As illustrated in FIG. 10, the shape of the slit 1005 may be, for example, a rectangle with a long side having a length L and a short side having a width W. The shape of the slit 1005 may be an oval with a long axis having a length L and a short axis having a width W.

As described above, the slit 1005 that satisfies any one of Equation (1), Equation (2), and Equation (4) above is formed in the metal housing 1002, whereby the slit 1005 functions as a slot antenna. Thus, the wireless communication system 1001 capable of wireless communication between the wireless sensor 1003 provided inside the metal housing 1002 and the outside can be constructed.

In the slot antenna, radio waves having a wavelength $\lambda$ that satisfies any one of Equation (1), Equation (2), and Equation (4) above produce electromagnetic resonance with the metal housing 1002 and radiate to the outside. On the other hand, in the slot antenna, radio waves that significantly deviate from such wavelength $\lambda$ do not produce electromagnetic resonance with the metal housing 1002 and unlikely radiate to the outside. Thus, the wireless communication system 1001 that suppresses unnecessary radiation can be achieved.

Figure 11:
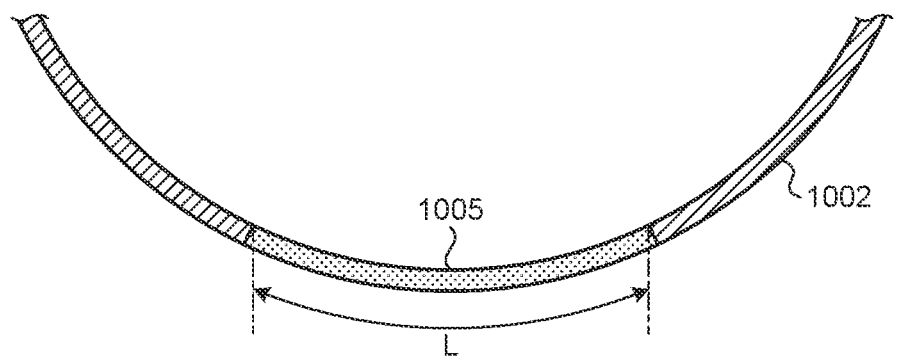
FIG. 11 is a diagram illustrating an example of a cross section along A-A illustrated in FIG. 10.

FIG. 11 is a diagram illustrating an example of a cross section along A-A illustrated in FIG. 10. As illustrated in FIG. 11, when the surface of the metal housing 1002 provided with the slit 1005 is a curved surface, the length L of the slit 1005 is determined by the length along the curved surface of the metal housing 1002.

Figure 12:
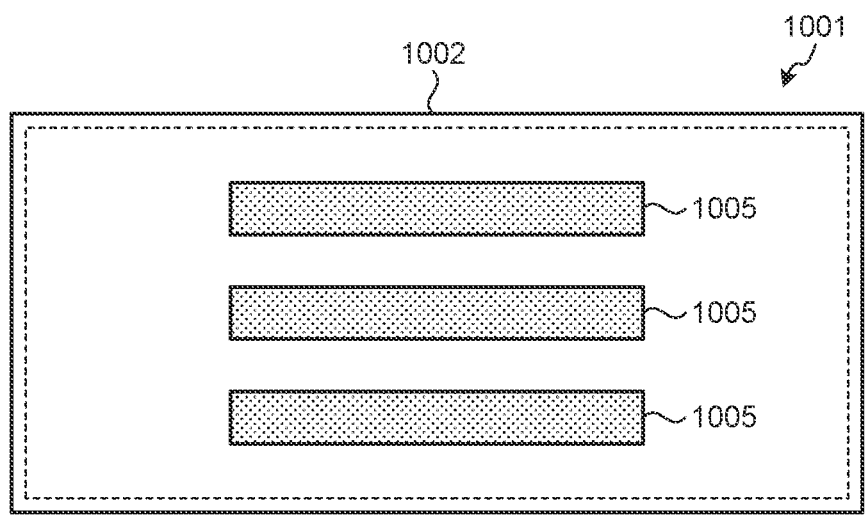
FIG. 12 is a diagram of slits of the wireless communication system according to a modification of the first embodiment as viewed from the front.

FIG. 12 is a diagram of slits of the wireless communication system according to a modification of the first embodiment as viewed from the front. As illustrated in FIG. 12, the metal housing 1002 may have a plurality of slits 1005 formed at regular intervals to construct a slot array beamforming antenna. In this case, although the directivity is intensified, the radio field intensity in the front direction can be enhanced.

In this way, a plurality of slits 1005 that satisfy Equation (1) or Equation (2) above are provided at regular intervals in the metal housing 1002, whereby the slits 1005 function as a slot array beamforming antenna. Thus, the wireless communication system 1001 capable of wireless communication between the wireless sensor 1003 provided inside the metal housing 1002 and the outside can be constructed.

Instead of the slit 1005, it is conceivable to provide a circular hole having a diameter of $\lambda/4$ in the metal housing 1002. In the following, a comparison of the effects with the case in which the metal housing 1002 is provided with a circular hole having a diameter of $\lambda/4$ will be described.

Figure 13:
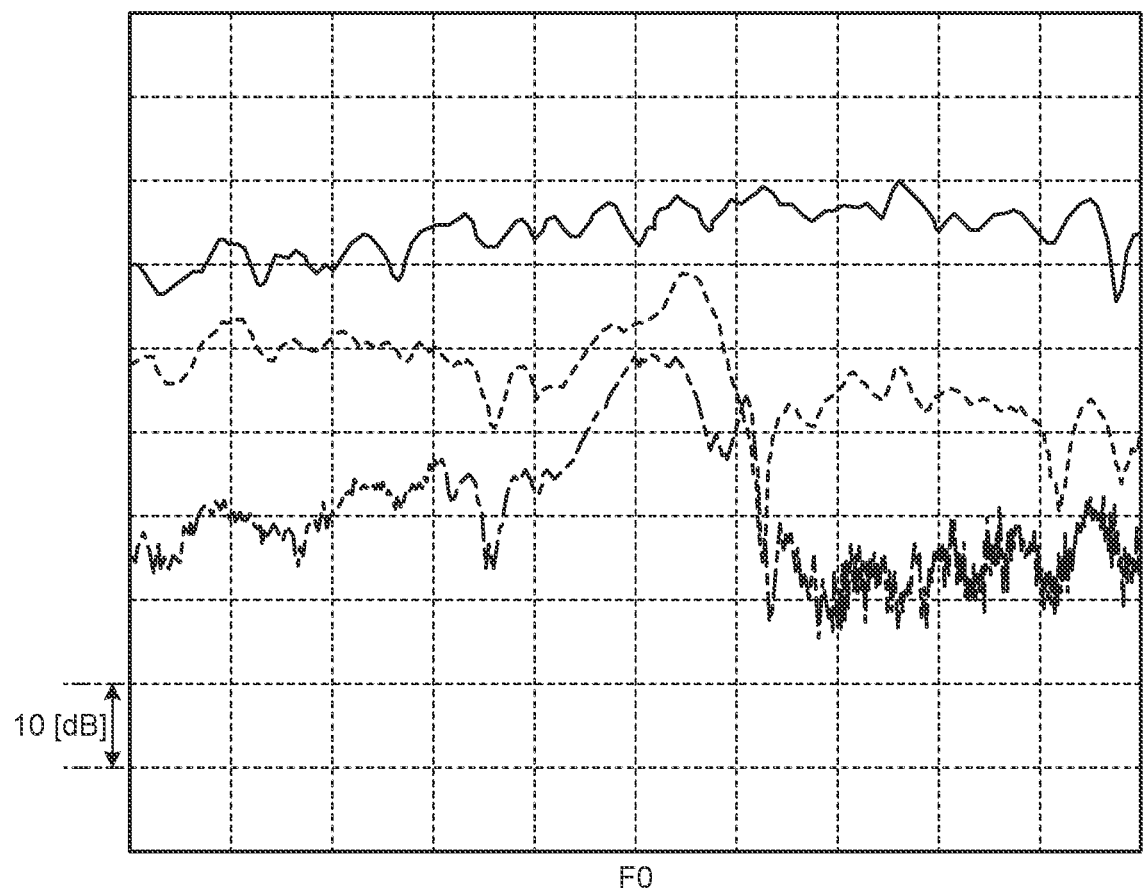
FIG. 13 is a diagram illustrating an example of reception sensitivity of radio waves for explaining the effect of the wireless communication system according to the first embodiment.

FIG. 13 is a diagram illustrating an example of reception sensitivity of radio waves for explaining the effect of the wireless communication system according to the first embodiment. In FIG. 13, the horizontal axis indicates frequency, and the vertical axis indicates the intensity of radio waves. The solid line in FIG. 13 illustrates an example of reception sensitivity when the metal housing 2 is not present, that is, when no electromagnetic shield is present on a communication path. The broken line in FIG. 13 illustrates an example of reception sensitivity of the wireless communication system 1001 according to the first embodiment. The dashed-dotted line in FIG. 13 illustrates an example of reception sensitivity when the metal housing 1002 is provided with a circular hole having a diameter of $\lambda/4$.

As illustrated by the dashed-dotted line in FIG. 13, when the metal housing 1002 is provided with a circular hole having a diameter of $\lambda/4$, the reception sensitivity in the vicinity of the fundamental frequency F0 of radio waves deteriorates approximately by 15 [dB], compared with when no electromagnetic shield is present on the communication path (the solid line in FIG. 13). In the wireless communication system 1001 according to the present embodiment, as illustrated by the broken line in FIG. 13, the reception sensitivity in the vicinity of the fundamental frequency F0 of radio waves improves approximately by 5 [dB], compared with when the metal housing 1002 is provided with a circular hole having a diameter of $\lambda/4$ (the dashed-dotted line in FIG. 13). In other words, in the configuration according to the present embodiment in which the metal housing 1002 is provided with the slit 1005, the deterioration in reception sensitivity of radio waves can be suppressed with a smaller area compared with when the metal housing 1002 is provided with a circular hole having a diameter of $\lambda/4$.

Second Embodiment

Figure 14:
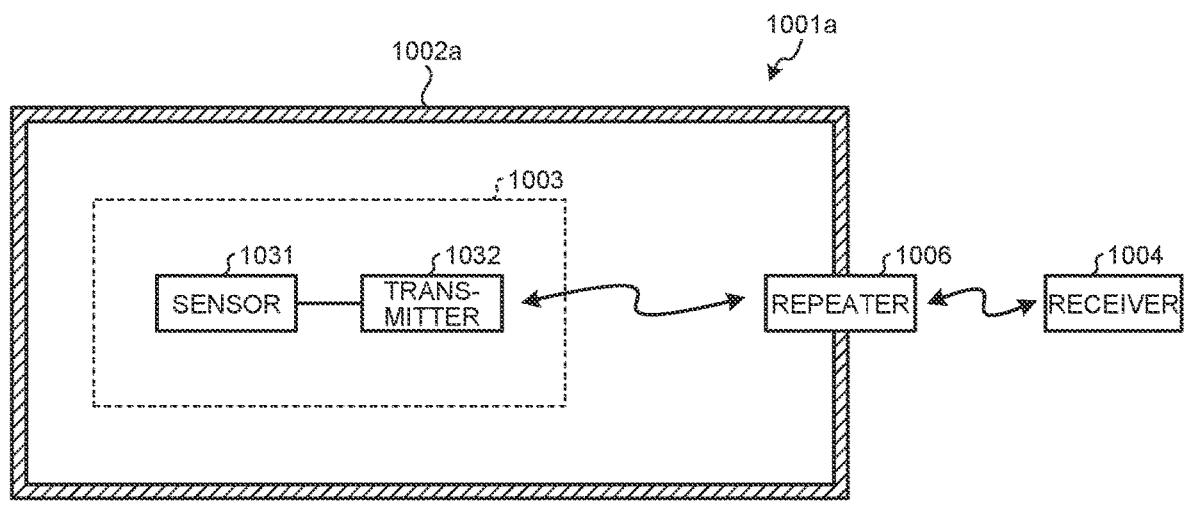
FIG. 14 is a schematic longitudinal sectional view of a wireless communication system according to a second embodiment.
Figure 15:
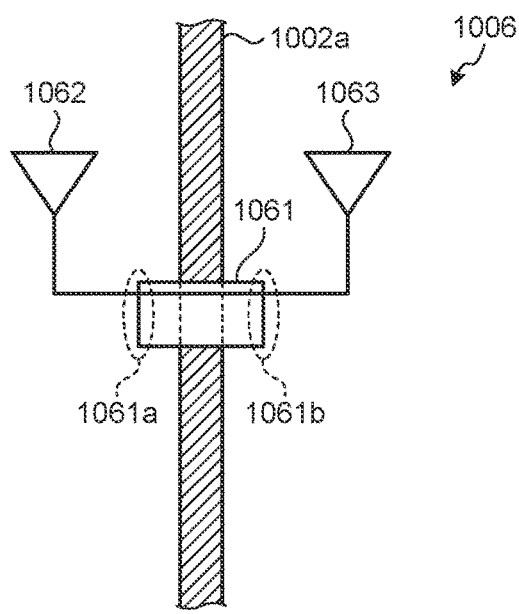
FIG. 15 is a schematic diagram illustrating a configuration example of a passive repeater.

FIG. 14 is a schematic longitudinal sectional view of a wireless communication system according to a second embodiment. FIG. 15 is a schematic diagram illustrating a configuration example of a passive repeater. The same components as in the configuration described in the foregoing first embodiment are denoted by the same reference signs and an overlapping description thereof is omitted.

As illustrated in FIG. 14, a wireless communication system 1001a according to the second embodiment includes a passive repeater 1006, instead of the slit 1005 functioning as a slot antenna.

As illustrated in FIG. 15, the passive repeater 1006 includes a receiving antenna 1062 provided inside a metal housing 1002a and a transmitting antenna 1063 provided outside the metal housing 1002a. The receiving antenna 1062 and the transmitting antenna 1063 are electrically connected by a coaxial cable 1061 through a hole formed in the metal housing 1002a. FIG. 15 illustrates an example in which the coaxial cable 1061 is used as a component that electrically connects the receiving antenna 1062 and the transmitting antenna 1063. However, the embodiment is not limited thereto. The component that electrically connects the receiving antenna 1062 and the transmitting antenna 1063 may be, for example, a connector such as a coaxial connector inserted in the hole formed in the metal housing 1002a.

The coaxial cable 1061 includes a terminal 1061a provided on the inner side of the metal housing 1002a and a terminal 1061b provided on the outer side of the metal housing 1002a. The receiving antenna 1062 is connected to the terminal 1061a. The transmitting antenna 1063 is connected to the terminal 1061b.

In the wireless communication system 1001a according to the present embodiment, when radio waves radiating from the transmitter 1032 of the wireless sensor 1003 reach the receiving antenna 1062 of the passive repeater 1006, the radio waves are radiated again from the transmitting antenna 1063 of the passive repeater 1006 through the coaxial cable 1061.

As described above, the passive repeater 1006 is provided instead of the slit 1005 in the first embodiment functioning as a slot antenna, whereby the wireless communication system 1001a capable of wireless communication between the wireless sensor 1003 provided inside the metal housing 1002a and the outside can be constructed.

For example, a non-radial antenna can be used as the receiving antenna 1062. This configuration enables communication with stable performance independently of the grounding condition of the antenna.

For example, a monopole antenna can be used as the receiving antenna 1062. This configuration enables the antenna to be installed even in a narrow metal housing.

For example, a microstrip patch antenna can be used as the receiving antenna 1062. This configuration enables the antenna to be installed even in a narrow metal housing.

For example, a pattern antenna can be used as the receiving antenna 1062. This configuration enables the antenna to be installed even in a narrow metal housing.

The kind and the shape of the receiving antenna 1062 are not limited. For example, a dipole antenna can also be used.

For example, a dipole antenna can be used as the transmitting antenna 1063. This configuration can improve communication capacity by increasing the gain of the transmitting antenna.

For example, a monopole antenna can be used as the transmitting antenna 1063. This configuration can provide an omnidirectional and nondirectional wireless communication system.

The kind and the shape of the transmitting antenna 1063 are not limited. For example, a microstrip patch antenna can also be used.

It is preferable to use a monopole antenna as the receiving antenna 1062 and a dipole antenna as the transmitting antenna 1063 in combination. This configuration can improve communication capacity by increasing the gain of the transmitting antenna while downsizing the receiving antenna installed in a narrow metal housing.

A microstrip patch antenna as the receiving antenna 1062 and a dipole antenna as the transmitting antenna 1063 may be used in combination. This configuration can improve communication capacity by increasing the gain of the transmitting antenna while downsizing the receiving antenna installed in a narrow metal housing.

A microstrip patch antenna as the receiving antenna 1062 and a monopole antenna as the transmitting antenna 1063 may be used in combination. This configuration can provide a communication system that is not influenced by the orientation of the transmitting antenna by making the transmitting antenna nondirectional while downsizing the receiving antenna installed in a narrow metal housing.

A monopole antenna as the receiving antenna 1062 and a monopole antenna as the transmitting antenna 1063 may be used in combination. This configuration can provide a communication system that is not influenced by the orientation of the transmitting antenna by making the transmitting antenna nondirectional while downsizing the receiving antenna installed in a narrow metal housing.

Third Embodiment

In the present embodiment, a specific application example of the wireless communication system in a motor including the wireless sensor-equipped bearing will be described. FIG. 16 is a diagram illustrating an example of the internal configuration of a motor including the wireless sensor-equipped bearing. The same components as in the configuration described in the foregoing embodiments are denoted by the same reference signs and an overlapping description thereof is omitted.

A motor 50 includes, as a basic configuration, a housing (metal housing) 51, a rotor 52, a stator 53, and an output shaft 54. The housing 51 corresponds to the metal housing 1002a in the second embodiment.

The rotor 52 and the output shaft 54 are rotatably held with respect to the housing 51 and the stator 53 of the motor 50. The wireless sensor-equipped bearing 1 is provided on the load side of the output shaft 54 to which a rotation control target 100 of the motor 50 is mechanically connected. In the present embodiment, the rotation control target 100 (which hereinafter may also be referred to as "load") of the motor 50 is, for example, a rotating machine such as a pump or a speed reducer.

The wireless sensor unit 5 is provided on the inner side of the bearing body 20 on the load side in the rotational axis Ax direction. An antenna (transmitting antenna) 47 of the wireless sensor unit 5 is disposed such that the radiation direction of radio waves is directed inward in the rotational axis Ax direction. The antenna (transmitting antenna) 47 of the wireless sensor unit 5 is configured with, for example, any one of a pattern antenna, a microstrip patch antenna, and a chip antenna.

As illustrated in the schematic longitudinal sectional view in FIG. 14 in the second embodiment, when the wireless sensor 1003 and the passive repeater 1006 are disposed at positions aligned on a straight line, the receiving antenna 1062 of the passive repeater 1006 can be disposed in the radiation direction of the transmitting antenna of the wireless sensor 1003, and communication with suppressed power loss (path loss) is possible.

When the wireless communication system according to the embodiment is applied to, for example, the motor 50 illustrated in FIG. 16, the arrangement of each element of the wireless communication system is limited by the structure of the housing 51, the rotor 52, and the stator 53 (for example, a rib provided on the housing 51, a winding of the rotor 52, a magnet of the stator 53, and the like) in a space A on the load side of the output shaft 54 provided with the wireless sensor-equipped bearing 1 inside the housing 51. It is therefore difficult to dispose the passive repeater in the radiation direction (the direction indicated by the arrow in FIG. 16) of radio waves from the antenna (transmitting antenna) 47 of the wireless sensor unit 5, and power loss (path loss) may be increased.

Figure 17A:
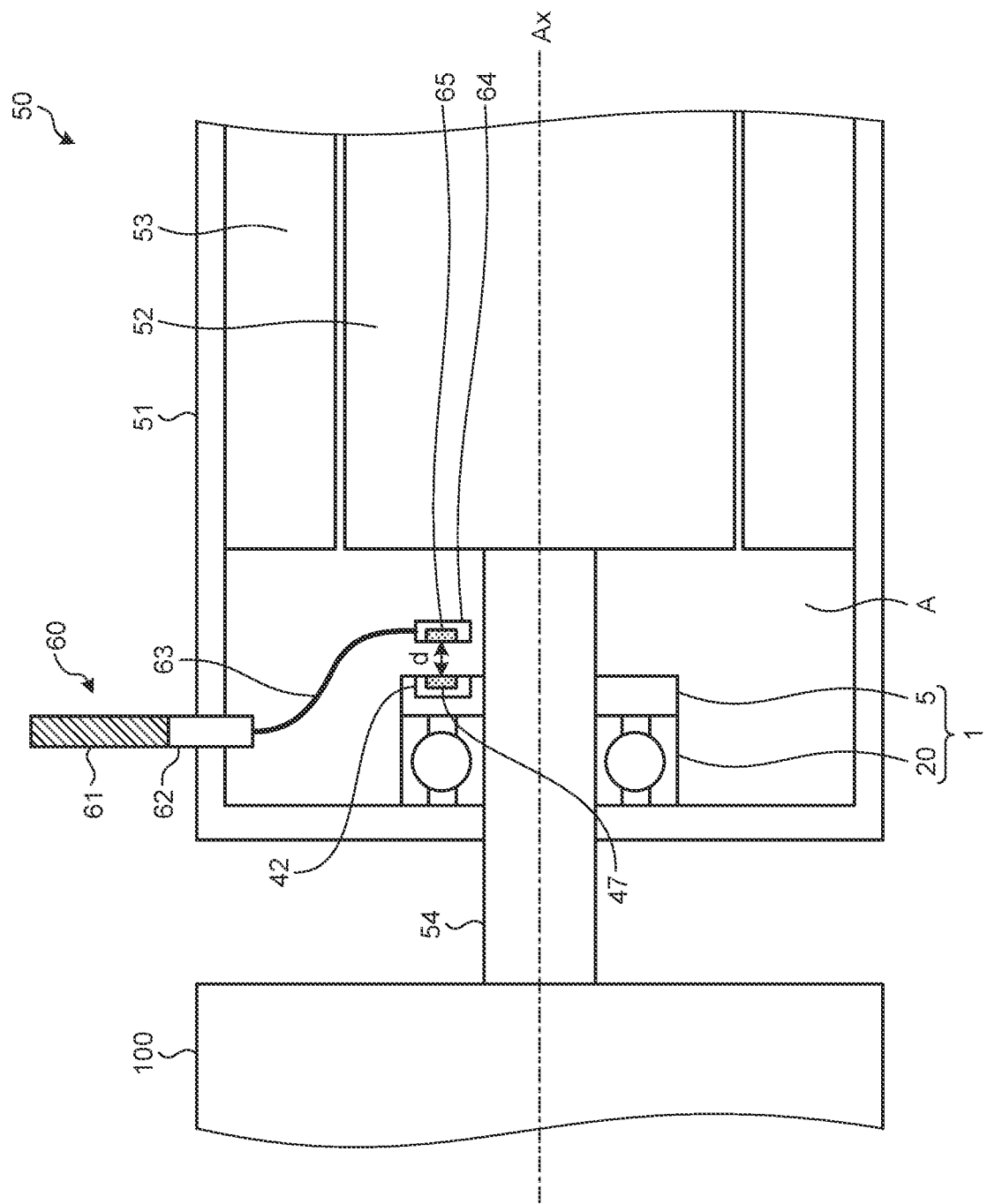
FIG. 17A is a diagram illustrating an application example of a wireless communication system according to a third embodiment.

FIG. 17A and FIG. 17B are diagrams illustrating application examples of the wireless communication system according to the third embodiment. The same components as those in FIG. 16 are denoted by the same reference signs and an overlapping description thereof is omitted.

A passive repeater 60 corresponds to the passive repeater 1006 in the second embodiment. In the examples illustrated in FIG. 17A and FIG. 17B, for example, as illustrated in the schematic longitudinal sectional view in FIG. 14 in the second embodiment, the passive repeater 60 is unable to be provided on an extension line in the radiation direction (the inner side in the rotational axis Ax direction) of radio waves from the antenna (transmitting antenna) 47 of the wireless sensor unit 5. In the examples illustrated in FIG. 17A and FIG. 17B, therefore, the passive repeater 60 has a terminal portion 62 inserted in a hole provided in the upper surface of the housing 51. In other words, the radiation direction of radio waves from the wireless sensor unit 5 is different from the boring direction of the hole of the housing 51 through which the terminal portion 62 of the passive repeater 60 is inserted.

In the following, a configuration for suppressing power loss (path loss) of radio waves radiating from the antenna (transmitting antenna) 47 of the wireless sensor unit 5 in the wireless communication system according to the third embodiment will be described.

A transmitting antenna 61 of the passive repeater 60 is provided outside the housing 51. The transmitting antenna 61 may be configured with, for example, a dipole antenna or a monopole antenna.

A receiving antenna 65 of the passive repeater 60 is provided inside the housing 51. The receiving antenna 65 may be configured with, for example, a pattern antenna or a microstrip patch antenna provided on an antenna board 64 made of resin.

The terminal portion 62 and the antenna board 64 are connected, for example, by a coaxial cable 63. In other words, the transmitting antenna 61 and the receiving antenna 65 are connected through the terminal portion 62 and the coaxial cable 63. The antenna board 64 and the coaxial cable 63 are connected, for example, by an SMA connector or a U.FL connector. Preferably, the coaxial cable 63 is a coaxial cable having a diameter of about 1.37 mm compatible with such an SMA connector or a U.FL connector. The way of connection between the transmitting antenna 61 and the receiving antenna 65 of the passive repeater 60 is not limited thereto.

As illustrated in FIG. 17A and FIG. 17B, the receiving antenna 65 of the passive repeater 60 is disposed to face the antenna (transmitting antenna) 47 of the wireless sensor unit 5. With this configuration, as illustrated in FIG. 17A and FIG. 17B, even when the radiation direction of radio waves from the wireless sensor unit 5 is different from the boring direction of the hole of the housing 51 through which the terminal portion 62 of the passive repeater 60 is inserted, the receiving antenna 65 of the passive repeater 60 can be disposed in the radiation direction of the antenna (transmitting antenna) 47 of the wireless sensor unit 5, and communication with suppressed power loss (path loss) is possible.

Furthermore, the receiving antenna 65 is arranged in the close vicinity of the wireless sensor unit 5 and connected to the antenna 61 with the coaxial cable 63 via the terminal 62, so that the wireless radio waves are radiated as if the wireless sensor unit 5 was directly connected to the antenna 61.

If the receiving antenna 65 is not provided, the wireless sensor unit 5 is physically connected to the antenna 61 with the coaxial cable 63 via the terminal 62. In other words, the wireless sensor unit 5 is formed integrally with the antenna 61, the terminal 62, and the coaxial cable 63. In this case, it becomes difficult to insert and arrange the wireless sensor unit 5 in the housing 51. In contrast, in the configuration illustrated in FIG. 17A, the wireless sensor unit 5 is not formed integrally with the antenna 61, the terminal 62, and the coaxial cable 63. Thus, the wireless sensor unit 5 can be easily inserted and arranged in the housing 51.

It is preferable that the receiving antenna 65 of the passive repeater 60 be disposed at a position where the distance d from the antenna (transmitting antenna) 47 of the wireless sensor unit 5 is $\lambda/2\pi$ or less, where the wavelength of fundamentals of radio waves is $\lambda$. With this configuration, the electromagnetic coupling action in a near field produced between the antenna (transmitting antenna) 47 of the wireless sensor unit 5 and the receiving antenna 65 of the passive repeater 60 can be utilized, and the effect of suppressing power loss (path loss) of radio waves radiating from the antenna (transmitting antenna) 47 of the wireless sensor unit 5 can be enhanced.

As illustrated in FIG. 17B, the antenna board 64 can be attached to the housing 51, for example, with a bearing retaining member 55 interposed. The present disclosure is not limited by the way of attachment of the antenna board 64.

In the present embodiment, an example in which the receiving antenna 65 of the passive repeater 60 is configured with a pattern antenna or a microstrip patch antenna has been described. However, the embodiment is not limited thereto. The present disclosure is not limited by the kind of the receiving antenna 65 of the passive repeater 60.

The motor including the wireless sensor-equipped bearing has been described as an application example of the wireless communication system according to the third embodiment. However, the wireless communication system according to the third embodiment may be applied to a rotating machine, such as a speed reducer, including the wireless sensor-equipped bearing. The present disclosure is not limited by the rotating machine to which the wireless communication system according to the third embodiment is applied.

The configuration of the third embodiment can suppress power loss (path loss) of radio waves radiating from the antenna (transmitting antenna) 47 of the wireless sensor unit 5.

Fourth Embodiment

Figure 18A:
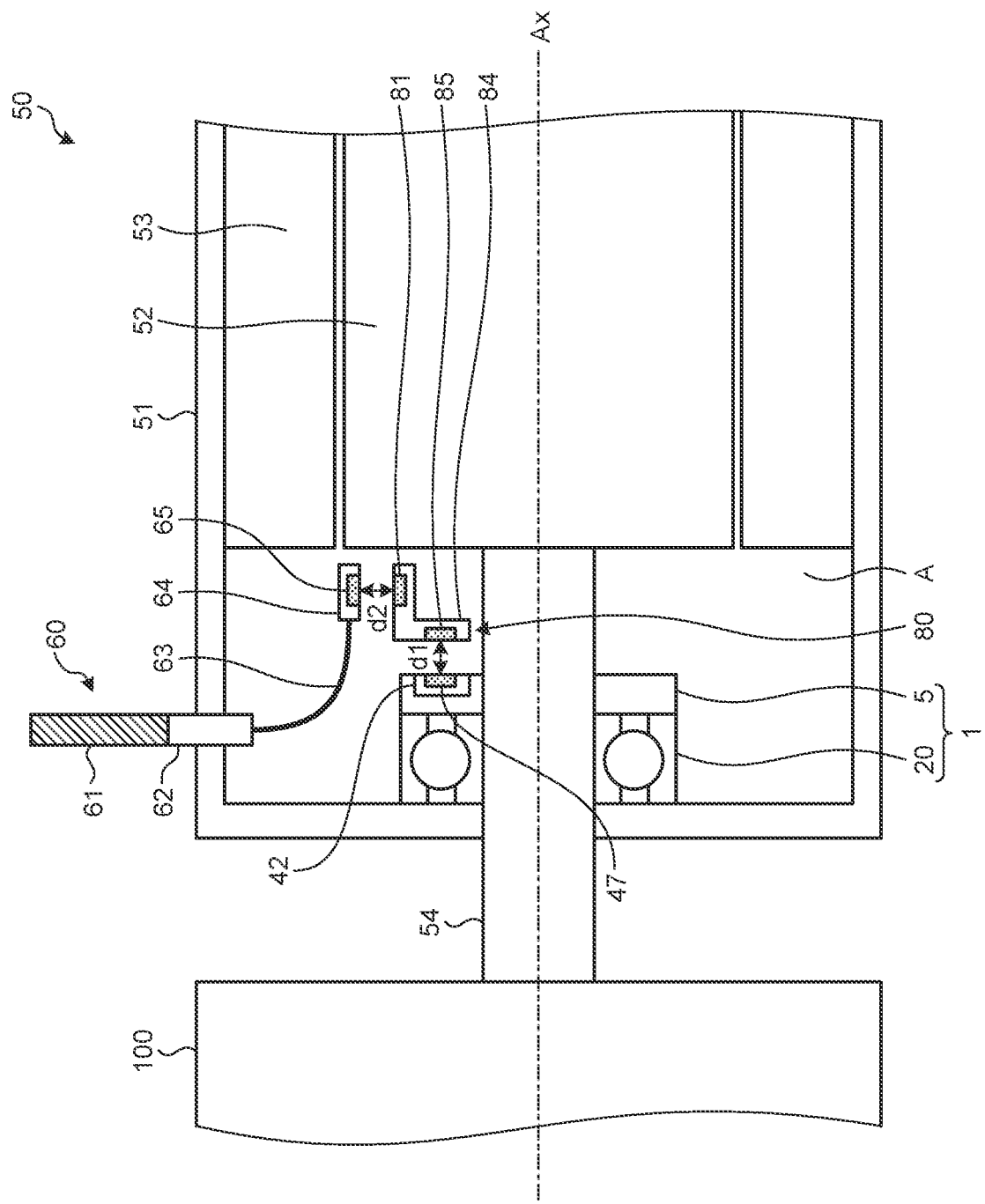
FIG. 18A is a diagram illustrating an application example of a wireless communication system according to a fourth embodiment.

FIG. 18A and FIG. 18B are diagrams illustrating application examples of a wireless communication system according to a fourth embodiment. In the present embodiment, a specific application example of the wireless communication system in a motor including the wireless sensor-equipped bearing will be described in the same manner as the third embodiment. The same components as in the configuration described in the foregoing embodiments are denoted by the same reference signs and an overlapping description thereof is omitted.

In the following, a configuration for suppressing power loss (path loss) of radio waves radiating from the antenna (transmitting antenna) 47 of the wireless sensor unit 5 in the wireless communication system according to the fourth embodiment will be described.

A first passive repeater 60 corresponds to the passive repeater 60 in the third embodiment. In the present embodiment, a second passive repeater 80 is provided inside the housing 51.

A receiving antenna 85 of the second passive repeater 80 and a transmitting antenna 81 of the second passive repeater 80 can be configured with, for example, pattern antennas or microstrip patch antennas provided on an antenna board 84 made of resin.

As illustrated in FIG. 18A and FIG. 18B, the receiving antenna 85 of the second passive repeater 80 is disposed to face the antenna (transmitting antenna) 47 of the wireless sensor unit 5. With this configuration, the receiving antenna 85 of the second passive repeater 80 can be disposed in the radiation direction of the antenna (transmitting antenna) 47 of the wireless sensor unit 5.

As illustrated in FIG. 18A and FIG. 18B, the transmitting antenna 81 of the second passive repeater 80 is disposed to face the receiving antenna 65 of the first passive repeater 60. With this configuration, as illustrated in FIG. 18A and FIG. 18B, even when the radiation direction of radio waves from the wireless sensor unit 5 is different from the boring direction of the hole of the housing 51 through which the terminal portion 62 of the first passive repeater 60 is inserted, power loss (path loss) of radio waves radiating from the antenna (transmitting antenna) 47 of the wireless sensor unit 5 can be suppressed.

It is preferable that the receiving antenna 85 of the second passive repeater 80 be disposed at a position where the distance d1 from the antenna (transmitting antenna) 47 of the wireless sensor unit 5 is $\lambda/2\pi$ or less, where the wavelength of fundamentals of radio waves is $\lambda$. With this configuration, the electromagnetic coupling action in a near field produced between the antenna (transmitting antenna) 47 of the wireless sensor unit 5 and the receiving antenna 85 of the second passive repeater 80 can be utilized, and the effect of suppressing power loss (path loss) of radio waves radiating from the antenna (transmitting antenna) 47 of the wireless sensor unit 5 can be enhanced.

It is preferable that the transmitting antenna 81 of the second passive repeater 80 and the receiving antenna 65 of the first passive repeater 60 be disposed at positions where the distance d2 therebetween is $\lambda/2\pi$ or less, where the wavelength of fundamentals of radio waves is $\lambda$. With this configuration, the electromagnetic coupling action in a near field produced between the transmitting antenna 81 of the second passive repeater 80 and the receiving antenna 65 of the first passive repeater 60 can be utilized, and the effect of suppressing power loss (path loss) of radio waves radiating from the transmitting antenna 81 of the second passive repeater 80 can be enhanced.

As illustrated in FIG. 18B, the antenna board 84 can be attached to the housing 51, for example, with the bearing retaining member 55 interposed. The present disclosure is not limited by the way of attachment of the antenna board 84. The receiving antenna 85 of the second passive repeater 80 and the transmitting antenna 81 of the second passive repeater 80 may be provided on respective different boards and the boards may be connected to each other by a coaxial cable.

In the present embodiment, an example in which the receiving antenna 65 of the first passive repeater 60 and the receiving antenna 85 of the second passive repeater 80 are configured with pattern antennas or microstrip patch antennas has been described. However, the embodiment is not limited thereto. The present disclosure is not limited by the kind of the receiving antenna 65 of the first passive repeater 60 and the receiving antenna 85 of the second passive repeater 80.

The motor including the wireless sensor-equipped bearing has been described as an application example of the wireless communication system according to the fourth embodiment in the same manner as the third embodiment. However, the wireless communication system according to the fourth embodiment may be applied to a rotating machine, such as a speed reducer, including the wireless sensor-equipped bearing. The present disclosure is not limited by the rotating machine to which the wireless communication system according to the fourth embodiment is applied.

The configuration of the fourth embodiment can suppress power loss (path loss) of radio waves radiating from the antenna (transmitting antenna) 47 of the wireless sensor unit 5.

Fifth Embodiment

In the present embodiment, a specific application example of the wireless communication system in a speed reducer including the wireless sensor-equipped bearing will be described. FIG. 19 is a diagram illustrating an example of the internal configuration of a speed reducer including the wireless sensor-equipped bearing. The same components as in the configuration described in the foregoing embodiments are denoted by the same reference signs and an overlapping description thereof is omitted.

A speed reducer 70 includes, as a basic configuration, a housing (metal housing) 71, an output shaft 74, and a gear 75. The housing 71 corresponds to the metal housing 1002a in the second embodiment. In FIG. 19, among a plurality of gears that constitute the speed reducer 70, one gear 75 provided on the output shaft 74 is depicted. However, the number of gears is not limited to one.

The gear 75 and the output shaft 74 are rotatably held with respect to the housing 71 of the speed reducer 70. The wireless sensor-equipped bearing 1 is provided on the load side of the output shaft 74 to which a rotation control target 100 of the speed reducer 70 is mechanically connected.

The wireless sensor unit 5 is provided on the inner side of the bearing body 20 in the rotational axis Ax direction. The antenna (transmitting antenna) 47 of the wireless sensor unit 5 is disposed such that the radiation direction of radio waves is directed inward in the rotational axis Ax direction.

When the wireless communication system according to the embodiment is applied to, for example, the speed reducer 70 illustrated in FIG. 19, the arrangement of each element of the wireless communication system is limited by the structure of the housing 71 (for example, a rib provided on the housing 71) or the gear in a space B on the load side of the output shaft 74 provided with the wireless sensor-equipped bearing 1 inside the housing 71. It is therefore difficult to dispose the passive repeater in the radiation direction (the direction indicated by the arrow in FIG. 16) of radio waves from the antenna (transmitting antenna) 47 of the wireless sensor unit 5, and power loss (path loss) may be increased.

Figure 20A:
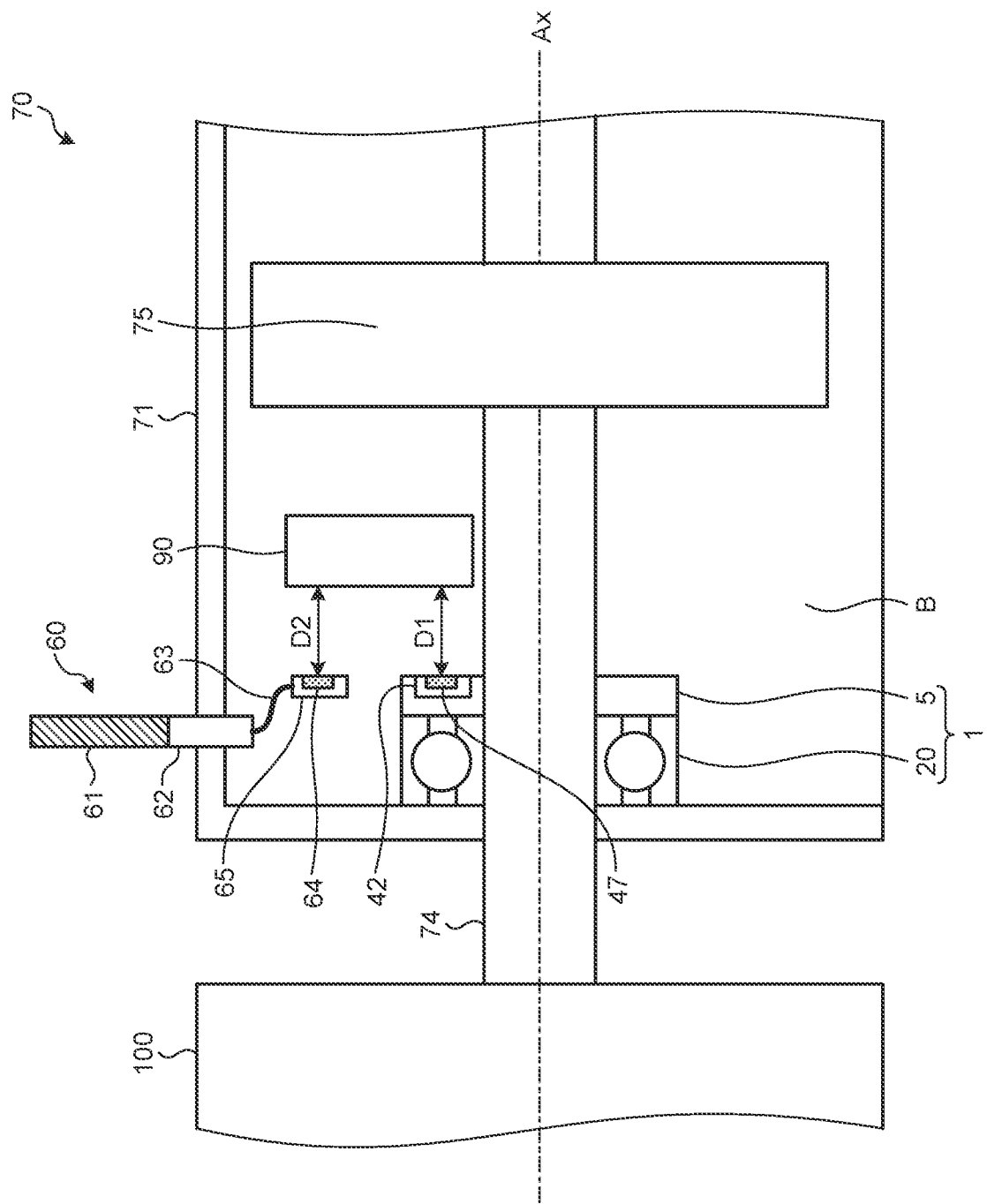
FIG. 20A is a diagram illustrating an application example of a wireless communication system according to a fifth embodiment.

FIG. 20A and FIG. 20B are diagrams illustrating application examples of a wireless communication system according to a fifth embodiment. The same components as those in FIG. 19 are denoted by the same reference signs and a description thereof is omitted.

The passive repeater 60 corresponds to the passive repeater 100b in the second embodiment. In the examples illustrated in FIG. 20A and FIG. 20B, for example, as illustrated in the schematic longitudinal sectional view in FIG. 14 in the second embodiment, the passive repeater 60 is unable to be provided on an extension line in the radiation direction (the inside in the rotational axis Ax direction) of radio waves from the antenna (transmitting antenna) 47 of the wireless sensor unit 5. In the example illustrated in FIG. 20A and FIG. 20B, therefore, the passive repeater 60 has a terminal portion 62 inserted in a hole provided in the upper surface of the housing 71. In other words, the radiation direction of radio waves from the wireless sensor unit 5 is different from the boring direction of the hole of the housing 71 through which the terminal portion 62 of the passive repeater 60 is inserted.

In the following, a configuration for suppressing power loss (path loss) of radio waves radiating from the antenna (transmitting antenna) 47 of the wireless sensor unit 5 in the wireless communication system according to the fifth embodiment will be described.

In the present embodiment, a radio wave reflector 90 that reflects radio waves is provided in the space B on the load side of the output shaft 74 provided with the wireless sensor-equipped bearing 1 inside the housing 71. As illustrated in FIG. 20B, the radio wave reflector 90 can be attached to the housing 71, for example, with a radio wave reflector-attaching member 75 interposed. The present disclosure is not limited by the way of attachment of the radio wave reflector 90.

The radio wave reflector 90 is preferably, for example, a metal with a higher degree of reflection loss than iron. Specifically, the radio wave reflector 90 can be formed of, for example, any one of copper, nickel, and aluminum, or an alloy containing 50% or more of one of copper, nickel, and aluminum.

As illustrated in FIG. 20A and FIG. 20B, the radio wave reflector 90 is disposed to face the antenna (transmitting antenna) 47 of the wireless sensor unit 5. With this configuration, the radio wave reflector 90 can be disposed in the radiation direction of the antenna (transmitting antenna) 47 of the wireless sensor unit 5.

The receiving antenna 65 of the passive repeater 60 is disposed to face the radio wave reflector 90. With this configuration, as illustrated in FIG. 20A and FIG. 20B, even when the radiation direction of radio waves from the wireless sensor unit 5 is different from the boring direction of the hole of the housing 71 through which the terminal portion 62 of the passive repeater 60 is inserted, power loss (path loss) of radio waves radiating from the antenna (transmitting antenna) 47 of the wireless sensor unit 5 can be suppressed.

Figure 21:
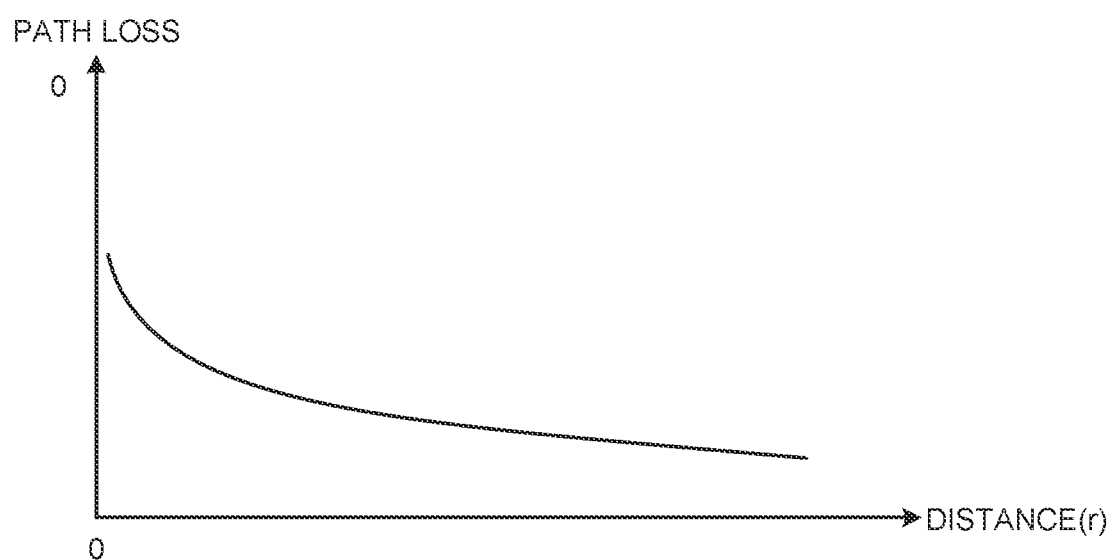
FIG. 21 is a diagram illustrating an example of path loss of radio waves in free space.

FIG. 21 is a diagram illustrating an example of path loss of radio waves in free space. The path loss of radio waves in free space can be represented by $20 \log(4\pi r/\lambda)$ (dBm) where the wavelength of fundamentals of radio waves is $\lambda$, and the distance is r. The path loss of radio waves in free space increases as the distance r increases, as illustrated in FIG. 21.

In the present embodiment, it is preferable that the radio wave reflector 90 be disposed at a position where the distance D1 from the antenna (transmitting antenna) 47 of the wireless sensor unit 5 is $2\lambda$ or less, where the wavelength of fundamentals of radio waves is $\lambda$. More preferably, the radio wave reflector 90 is disposed at a position where the distance D1 between the antenna (transmitting antenna) 47 of the wireless sensor unit 5 and the radio wave reflector 90 is $\lambda$ or less.

In the present embodiment, it is preferable that the receiving antenna 65 of the passive repeater 60 be disposed at a position where the distance D2 from the radio wave reflector 90 is $2\lambda$ or less, where the wavelength of fundamentals of radio waves is $\lambda$. More preferably, the receiving antenna 65 of the passive repeater 60 is disposed at a position where the distance D2 between the radio wave reflector 90 and the receiving antenna 65 of the passive repeater 60 is $\lambda$ or less.

This configuration can enhance the effect of suppressing power loss (path loss) of radio waves radiating from the antenna (transmitting antenna) 47 of the wireless sensor unit 5.

In the present embodiment, an example in which the receiving antenna 65 of the passive repeater 60 is configured with a pattern antenna or a microstrip patch antenna has been described. However, the embodiment is not limited thereto. The present disclosure is not limited by the kind of the receiving antenna 65 of the passive repeater 60.

The receiving antenna 65 of the passive repeater 60 is not necessarily disposed to face the radio wave reflector 90 as long as it is disposed, for example, at a position where radio waves radiating from the antenna (transmitting antenna) 47 of the wireless sensor unit 5 and reflected by the radio wave reflector 90 can be received. The receiving antenna 65 of the passive repeater 60 preferably has a high sensitivity in a direction perpendicular to the inner wall of the metal housing. Since radio waves are reflected when impinging on metal, radio waves are less likely to enter from a direction parallel to the metal wall surface. When the sensitivity is in a direction parallel to the metal wall surface, the metal (inner wall of the housing) tends to exist in a radiation pattern, leading to significant deterioration in performance. The sensitivity in a direction perpendicular to the inner wall of the metal housing therefore reduces the loss.

The speed reducer including the wireless sensor-equipped bearing has been described as an application example of the wireless communication system according to the fifth embodiment. However, the wireless communication system according to the fifth embodiment may be applied to a motor including the wireless sensor-equipped bearing, in the same manner as the third embodiment and the fourth embodiment. The wireless communication system according to the fifth embodiment is not limited to the applications to a motor and a speed reducer and may be applied to a rotating machine to which the wireless sensor-equipped bearing is applied in a metal housing. The present disclosure is not limited by a rotating machine to which the wireless communication system according to the fifth embodiment is applied. A metal part in the housing of the rotating machine, such as the rotor, stator, or winding of the motor, or the gear of the speed reducer, may be used as the radio wave reflector 90. Using the metal housing or a metal part in the metal housing as the radio wave reflector 90 enables communication without attaching an extra member in a narrow space.

The configuration of the fifth embodiment can suppress power loss (path loss) from the antenna (transmitting antenna) 47 of the wireless sensor unit 5 to the transmitting antenna 61 of the passive repeater 60.

The drawings used in the description above are conceptual diagrams for providing a qualitative description of the present disclosure, and the present disclosure is not limited by these drawings. The foregoing embodiments are examples of preferred embodiment of the present disclosure but the present disclosure is not limited to these embodiments. A variety of modifications can be carried out without departing from the spirit of the present disclosure.

According to the present invention, a wireless communication system with a wireless sensor that enables wireless communication between a wireless sensor provided inside a metal housing and the outside, with no power supply and with no wiring at least for the wireless sensor can be acquired.

In addition, a wireless communication distance is improved and the flexibility in layout is enhanced, for example, to allow a receiver to be installed on a wall surface or a ceiling. Since the receiver can be installed outside the flow line of people, a wireless communication system capable of achieving stable wireless communication can be provided.

Additional aspects of the present invention include, but limited to:

1. A wireless communication system comprising:
   a wireless sensor provided inside a metal housing;
   a receiver provided outside the metal housing to receive radio waves from the wireless sensor; and
   a slit formed in the metal housing, wherein
   a length L of the slit satisfies an equation below:

$L=(\lambda/2)\times(1/\sqrt{\varepsilon})$ where a wavelength of fundamentals of the radio waves is $\lambda$ and a relative permittivity of an opening of the slit is $\varepsilon$.

2. The wireless communication system according to the above aspect 1, wherein the opening of the slit is filled with resin.

3. The wireless communication system according to the above aspect 1, wherein the metal housing has a plurality of the slits formed at regular intervals.

4. The wireless communication system according to the above aspect 1, wherein the wireless sensor does not include wiring including a line for power supply from the outside of the metal housing.

What is claimed is:

1. A wireless communication system comprising:
   a wireless sensor provided inside a metal housing of a rotating machine provided with a shaft and a bearing rotatably holding the shaft with respect to the metal housing, the wireless sensor being disposed adjacent to the bearing and transmitting data of a condition of the bearing, and the date being detected by the wireless sensor;
   a receiver provided outside the metal housing to receive radio waves from the wireless sensor; and
   a passive repeater provided between the inside and the outside of the metal housing,
   wherein
   the passive repeater includes
      a receiving antenna provided inside the metal housing,
      a transmitting antenna provided outside the metal housing,
      a terminal portion inserted through a hole provided in the metal housing, and
      a coaxial cable connecting the terminal portion and the receiving antenna of the passive repeater,
   a radiation direction of the radio waves from the wireless sensor is directed to a direction parallel to a rotational axial direction of the shaft, and is different from a boring direction of the hole through which the terminal portion is inserted, and
   the receiving antenna of the passive repeater is drawn from the terminal portion by the coaxial cable at a position facing a transmitting antenna of the wireless sensor.

2. The wireless communication system according to claim 1, wherein, of the receiving antenna of the passive repeater and the transmitting antenna of the passive repeater, at least the receiving antenna of the passive repeater is a monopole antenna.

3. The wireless communication system according to claim 1, wherein, of the receiving antenna of the passive repeater and the transmitting antenna of the passive repeater, at least the receiving antenna of the passive repeater is a non-radial antenna.

4. The wireless communication system according to claim 1, wherein, of the receiving antenna of the passive repeater and the transmitting antenna of the passive repeater, at least the receiving antenna of the passive repeater is a microstrip patch antenna.

5. The wireless communication system according to claim 1, wherein, of the receiving antenna of the passive repeater and the transmitting antenna of the passive repeater, at least the transmitting antenna of the passive repeater is a dipole antenna.

6. The wireless communication system according to claim 1, wherein as a preferred aspect of the wireless communication system, of the receiving antenna of the passive repeater and the transmitting antenna of the passive repeater, at least the receiving antenna of the passive repeater is a pattern antenna.

7. The wireless communication system according to claim 1, wherein, of the receiving antenna of the passive repeater and the transmitting antenna of the passive repeater, at least the transmitting antenna of the passive repeater is a monopole antenna.

8. The wireless communication system according to claim 1, wherein the receiving antenna of the passive repeater is disposed at a position where a distance d from a transmitting antenna of the wireless sensor is $\lambda/2\pi$ or less, where a wavelength of fundamentals of the radio waves is $\lambda$.

9. The wireless communication system according to claim 8, wherein
   the transmitting antenna of the wireless sensor is any one of a pattern antenna, a microstrip patch antenna, and a chip antenna.

10. The wireless communication system according to claim 1, wherein the wireless sensor does not include wiring including a line for power supply from the outside of the metal housing.

* * * * *